INVENTORS
Robert E. Bible
Robert L. McIntyre
William F. Scott
Arville T. Trostrud, Jr.

Attorney

Fig. 4A
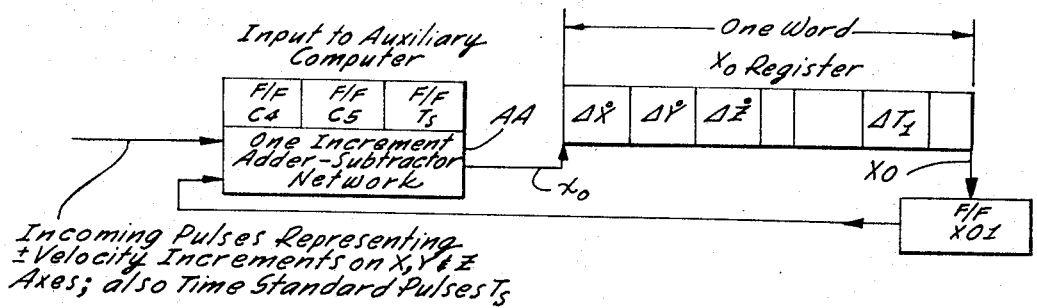
Fig. 4B  First Phase-Phase (φ1)
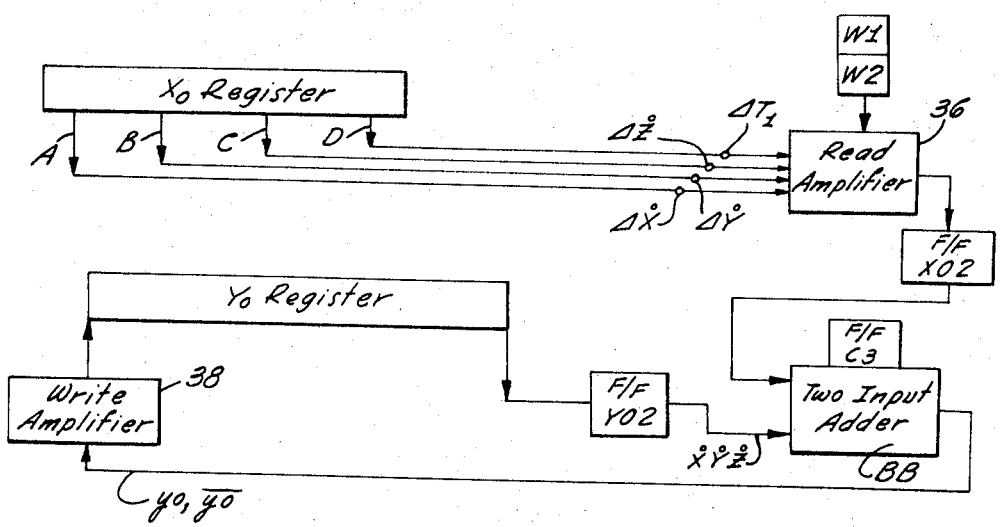

May 6, 1969     R. E. BIBLE ET AL     3,443,076
INPUT-OUTPUT AUXILIARY COMPUTER SYSTEM
Original Filed June 27, 1960                Sheet 4 of 16

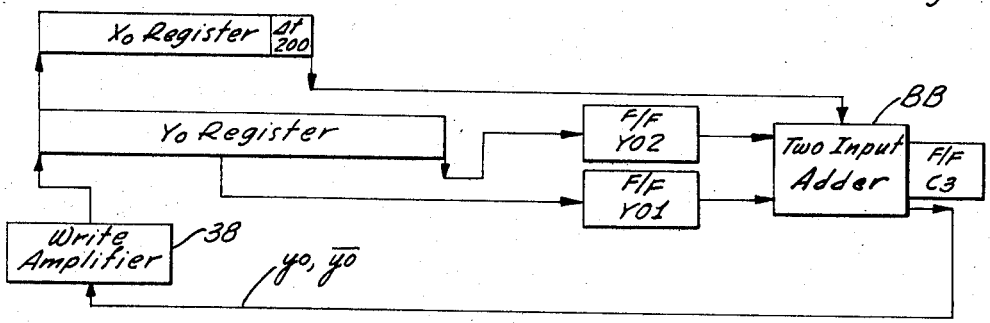

Fig. 4C  Second & Third Phases – Phases ($\phi2$ & $\phi3$)

Integration as a Function of Real Time

The Velocities $\dot{X}$, $\dot{Y}$ & $\dot{Z}$ are Integrated on a Real Time Basis to Provide Distances $X$, $Y$ & $Z$. The Distances are Stored as Binary Numbers at other Locations in the Yo Register

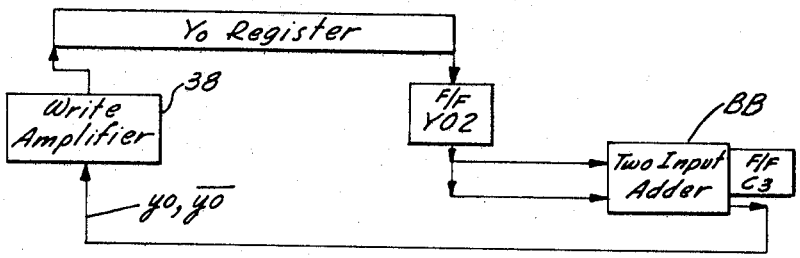

Fig. 4D  Fourth Phase – Phase ($\phi4$)

Information in Yo Register Shifted to Precess for Data Link Operation

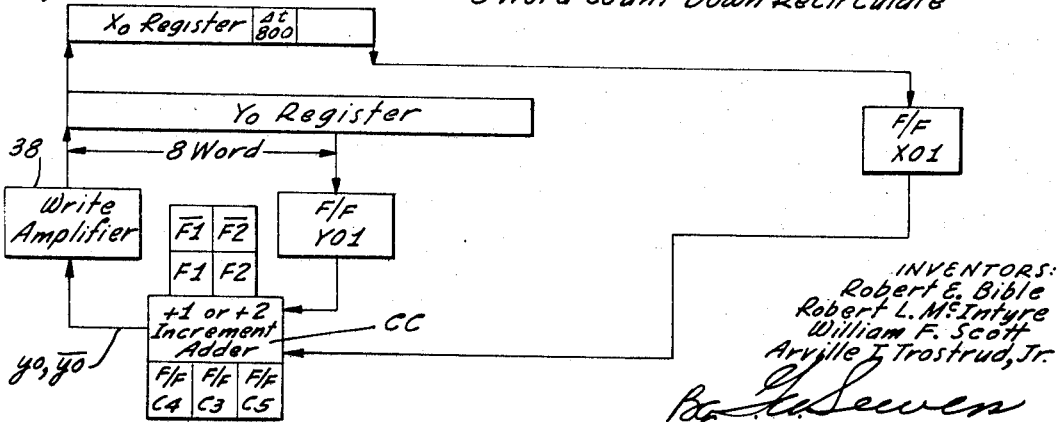

Fig. 4E  Fifth Phase – Phase ($\phi5$)

8 Word Count Down Recirculate

INVENTORS:
Robert E. Bible
Robert L. McIntyre
William F. Scott
Arville T. Trostrud, Jr.

Attorney

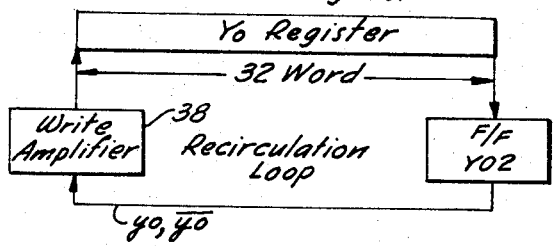
Fig. 4F Sixth Phase-Phase (φ6)
32-Word Register
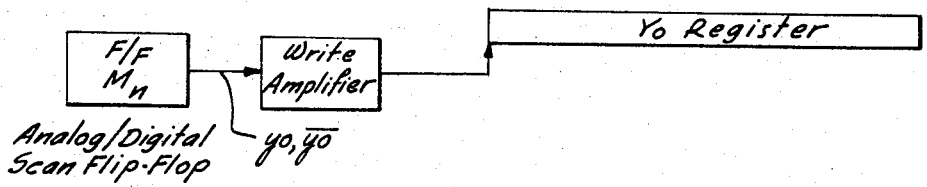
Fig. 4G Seventh Phase-Phase (φ7)
Analog/Digital Input
Fig. 5
| Phase($\phi_s$) | K4 | K5 | K6 |
|---|---|---|---|
| 1 | 0 | 1 | 1 |
| 2 | 1 | 0 | 1 |
| 3 | 1 | 1 | 1 |
| 4 | 0 | 0 | 1 |
| 5 | 0 | 1 | 0 |
| 6 | 1 | 0 | 0 |
| 7 | 0 | 0 | 0 |
| 8 | 1 | 1 | 0 |
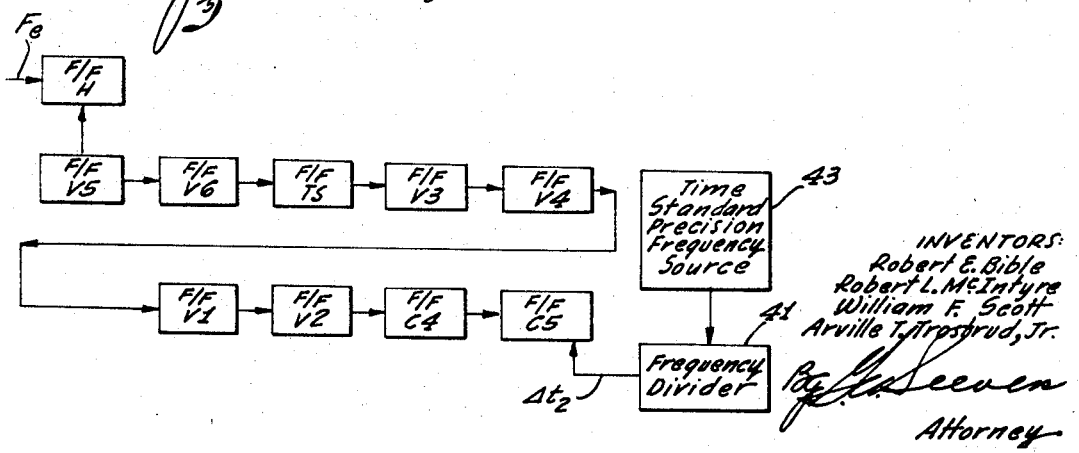
Fig. 6 Shift Register and Counter
INVENTORS:
Robert E. Bible
Robert L. McIntyre
William F. Scott
Arville T. Trosdrud, Jr.
Attorney

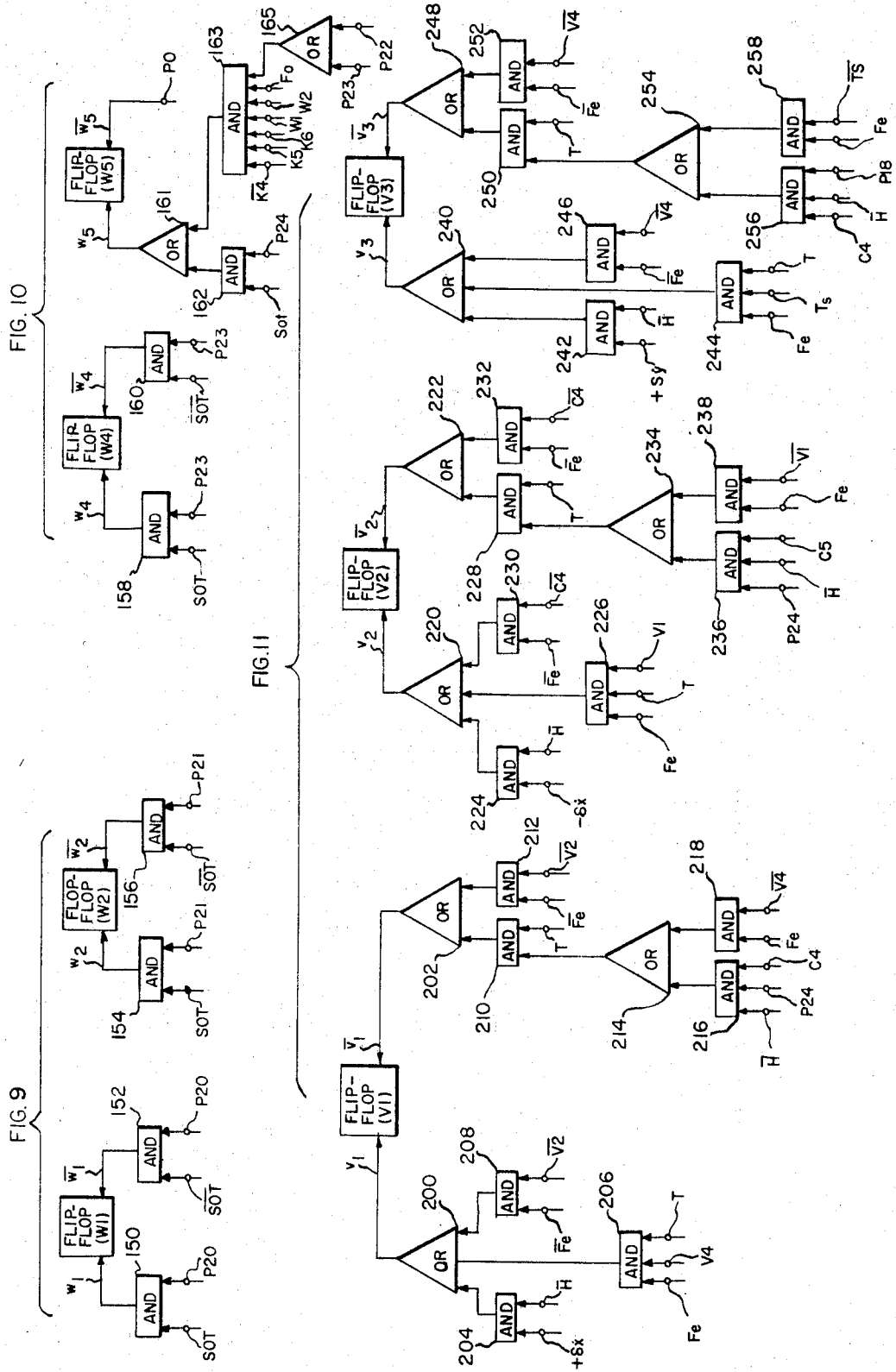

SHIFT REGISTER AND COUNTER

ADD FLIP FLOP FOR
ONE INCREMENT ADDER-SUBTRACTER

SUBTRACT FLIP FLOP
FOR THE ONE INCREMENT
ADDER SUBTRACTER

FIG. 18    x̄o-INPUT WRITE AMPLIFIER 32

CARRY FLIP FLOP FOR TWO INPUT
ADDER TO YO REGISTER

United States Patent Office 3,443,076
Patented May 6, 1969

3,443,076
INPUT-OUTPUT AUXILIARY COMPUTER SYSTEM
Robert E. Bible, Rancho Santa Fe, and Robert L. McIntyre and William F. Scott, Glendale, and Arville T. Trostrud, Jr., Encinitas, Calif., assignors to Singer-General Precision, Inc., a corporation of Delaware
Continuation of application Ser. No. 38,930, June 27, 1960. This application Aug. 18, 1964, Ser. No. 390,372
Int. Cl. G06f 3/00
U.S. Cl. 235—167
7 Claims

ABSTRACT OF THE DISCLOSURE

An auxiliary computer is provided for use with a general purpose computer to extend the capabilities of the general purpose computer. The auxiliary computer shares the same memory with the general purpose computer, and it responds to various commands to enable the general purpose computer, for example, to accept random pulse inputs, to perform high speed integrations, to calculate cut-off velocities, to transmit data-link information, to keep track of real time, and so on.

---

The present invention relates to electronic digital computers, and the like, and it relates more particularly to an improved small scale auxiliary computer system. The improved auxiliary computer of the invention is intended to be used in conjunction with a large scale general purpose computer to extend the capabilities of the general purpose computer and to render the general purpose computer particularly suitable for use in space vehicle guidance systems, and the like.

This application is a continuation of copending application Ser. No. 38,930, filed June 27, 1960, now abandoned.

A general object of the invention is to provide an improved small scale auxiliary computer system which functions, to provide a large scale general purpose computer with which it is associated with a variety of additional capabilities, including, for example, inter alia: a means for accepting random pulse inputs, high speed integration, calculating cut-off velocities, transmitting data-link information, keeping track of real time, accepting analog-digital inputs directly, presenting digital outputs to shaft encoders of intermediate values of the high speed functions, and generating asynchronous pulse outputs.

It will become apparent as the present description proceeds, that the auxiliary computer of the invention may be constructed to perform other functions so as to extend the capabilities of the general purpose computer, and that the utility of the auxiliary computer is not limited to vehicle guidance systems.

A primary object of the auxiliary computer/general purpose computer combination of the present invention, as will be described, is to permit high speed integrations to be made by the combination which are beyond the normal capabilties of the general purpose computer itself.

In the embodiment of the invention to be described, the auxiliary computer shares the magnetic memory drum of the general purpose computer, and it receives its instructions from a track on the memory drum. A variety of different operations of the auxiliary computer system are programmable by programming appropriate information into that track.

The auxiliary computer itself is not intended to operate normally as an independent, autonomous unit with respect to the general purpose computer. Rather, the auxiliary computer serves as an adjunct to the general purpose computer, and the two computers operate together as an integral system.

The embodiment of the invention, to be described herein, will be so described as associated with a general purpose computer, of the type disclosed and claimed in U.S. Patent No. 3,074,638. It will be understood, of course, that the auxiliary computer of the invention can be adapted for use with many different types of general purpose computers, and this will become evident as the description proceeds.

In the drawings:

FIGURES 4A to 4G are schematic representations of different operational modes of the auxiliary computer of the invention, in the embodiment to be described;

FIGURE 5 is a table illustrating the configurations of certain control flip-flops for establishing the different operational modes of the auxiliary computer of the invention;

FIGURE 6 shows a group of flip-flops which are used to form a shift register and counter, for purposes to be described;

FIGURE 9 shows two word-counter flip-flops of the main computer, and also shows appropriate logic control circuitry for time sharing those flip-flops to enable them to perform certain control functions for the input-output system;

FIGURE 10 shows two additional word-counter flip-flops of the main general purpose computer and also shows appropriate logic control circuitry for causing those flip-flops additionally to perform certain control functions in the input-output system;

FIGURES 11 and 12 show a group of flip-flops which are controlled by received velocity increment pulses and the logic associated therewith;

The auxiliary system to be described, for example, can be used in conjunction with a general purpose computer to carry out the following functions and operations:

(a) Integration of a function relative to real time.

(b) Reduction of the magnitude of a function to zero by counting with real time increments until a spill-over, or a sign change, of the function is achieved.

(c) Recirculation of a function in unchanged form.

(d) Receipt of a function from analog-digital input devices.

(e) Summation of a function from a high speed asynchronous pulse accumulator register.

(f) Production of an output function to position a servo system.

(g) Position continuously a function so that information taken from the function may be transmitted by way of some data link means or telemeter system.

(h) Accumulation of real time increments.

Figure 1:
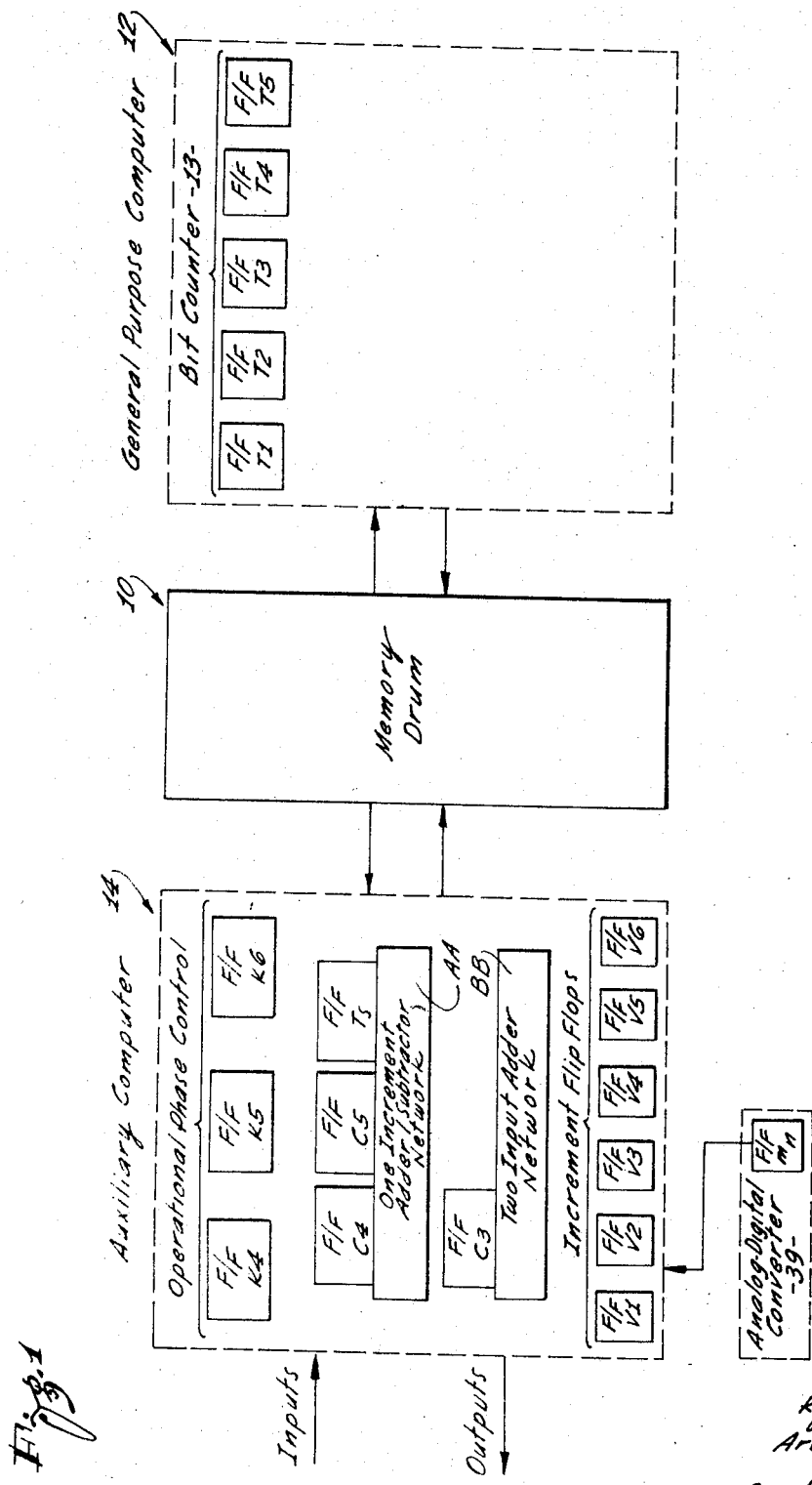
FIGURE 1 is a block diagram illustrating the manner in which an auxiliary computer, which may be constructed in accordance with the concepts of the present invention, shares the same common memory with the general purpose computer with which it is associated.

In the block diagram of FIGURE 1, a memory drum 10 is provided, this drum being shared by a general purpose computer 12 and by an auxiliary computer 14, the latter being constructed in accordance with the concepts of the invention. The memory drum 10 may be a usual magnetic memory drum, as will be described. It will also become evident that other types of memories may be used.

Figure 2:
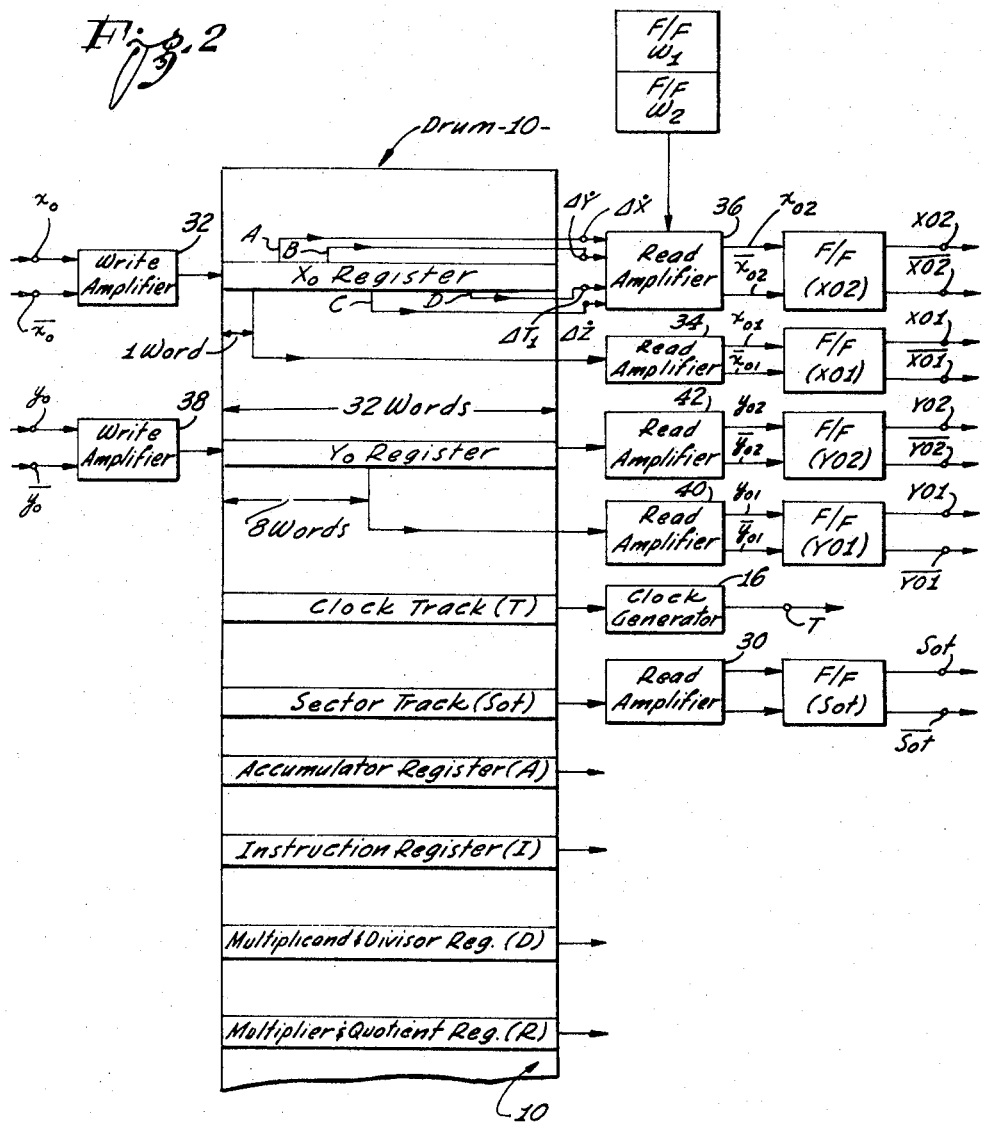
FIGURE 2 is a schematic representation of a typical magnetic drum memory system of a general purpose computer, the representation showing the different tracks on the memory drum which are utilized by the general purpose computer, and showing certain additional tracks which are utilized by the auxiliary computer of the invention.

As shown in FIGURE 2, information may be recorded on the magnetic memory drum 10 in a plurality of imaginary tracks, or channels, which are spaced axially along the drum adjacent one another. These tracks have corresponding read heads associated with them which read the information recorded on the individual tracks respectively associated with the read heads. In addition, certain ones of the tracks have corresponding write heads associated with them which can be controlled to write data on the respective tracks with which they are associated. Each of the tracks on the drum 10 is divided into a number of sectors. For example, each track may include 64 sectors, and each sector may accommodate a 25 bit block of binary coded data.

One of the tracks on the magnetic drum 10 is the clock track (T). This track, as is well known, contains a plurality of recordings which are spaced from one another by an amount corresponding to the respective binary bits which make up the information stored on the drum in the different tracks. The recordings on the clock track are read by an appropriate read head and introduced to a clock generator 16. The clock generator 16 responds to the signals from the above-mentioned read head to develop a series of clock pulses designated (T). These clock pulses are used, in usual manner, to time the actual triggering of all the flip-flops and other components of the general purpose computer 12.

The magnetic memory drum 10 also includes a plurality of additional tracks (not shown) which constitute the main memory for the general purpose computer 12. As is well known, the various instructions, operands, and other information required by the general purpose computer 12, may be stored on the tracks of the main memory.

The magnetic memory drum 10 also includes an accumulator register track (A), an instruction register track (I), a multiplicand and divisor track (D), and a multiplier and quotient track (R). These latter tacks form part of known types of circulating registers utilized in the various sections of the general purpose computer 12. As is well known, appropriate read and write heads, amplifiers, and other logic components are associated with the tracks described above.

The magnetic memory drum 10 also includes a sector address track which is designated $Sot$. This sector address track is utilized for control purposes by both the general purpose computer 12, and by the auxiliary computer 14, as will be described. The sector address track ($Sot$) has binary numbers recorded in it which constitute the addresses of the different sectors of each track of the magnetic memory drum. The read head associated with the sector addres strack ($Sot$) is coupled to a read amplifier 30. The read amplifier 30 controls a flip-flop ($Sot$) which produces output terms $Sot$ and $\overline{Sot}$.

The composition of the sector address track ($Sot$) and the logic control circuitry and components associated with that track, as well as the logic components of the circulating registers mentioned above, are described in detail in the Patent 3,074,638.

As illustrated in FIGURE 2, the magnetic memory drum 10 also includes a track for a circulating register $Yo$ which is utilized by the auxiliary computer 14. The magnetic memory drum 10 also includes a track for a circulating register $Xo$, which is also utilized by the auxiliary computer.

In a manner to be described, the $Xo$ register of the auxiliary computer is intended to accept random pulse inputs. These inputs may extend up to 6,000 per second, for example. The random pulse inputs may represent, for example, velocity changes along three distinct axes, undergone by a vehicle in which the system is installed.

A one-increment adder-subtracter circuit AA (FIGURE 1) sums the input pulses and stores these pulses in the $Xo$ register. The $Xo$ register functions as a fast accumulator, and it makes a complete circulation each word time of the auxiliary computer.

An appropriate write head is associated with the $Xo$ track on the magnetic drum 10, and a write amplifier 32 it coupled to that write head. The input to the write amplifier 32 is designated $x_0$, $\overline{x}_0$. The $Xo$ register track has a first read head displaced along the track from the write head by a selected distance corresponding to one word time in the auxiliary computer. This read head introduces its output to a read amplifier 34. The read amplifier 34 is couple to a flip-flop XO1. The flip-flop XO1 produces output terms XO1 and $\overline{XO1}$.

The track $Xo$ also has a plurality of additional read heads (designated A, B, C and D) associated with it, for reasons to be described, and these additional read heads selectively introduce their outputs to a read amplifier 36. The read amplifier 36 is coupled to a flip-flop XO2. This latter flip-flop develops output terms XO2 and $\overline{XO2}$.

Figure 3:
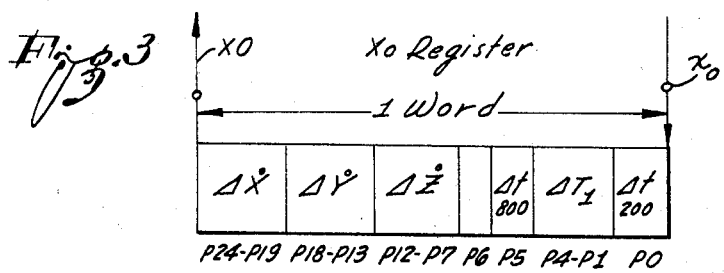
FIGURE 3 is a schematic representation of a portion of one of the tracks on the memory drum of FIGURE 1, the illustrated portion serving as a register to store information for the input-output system at segregated locations, as shown.

The one-word $Xo$ register is divided into four sections, as shown in FIGURE 3. The random pulse inputs received by the $Xo$ register, as noted, will be considered as corresponding, for example, to velocity changes of a vehicle (in which the computers are installed) along an orthogonal set of X, Y and Z axes. These axes may be vehicle referenced, for example, or referenced to inertial space. These velocity changes are accumulated in the various locations in the $Xo$ register designated $\Delta \dot{X}$, $\Delta \dot{Y}$ and $\Delta \dot{Z}$. Each location accommodates, for example, six binary bits. As shown in FIGURE 3, the various locations extend from P24–P19, P18–P13, and P13–P7, respectively.

A further section of the $Xo$ register accumulates time standard pulses, the formation of which will be explained. The accumulated pulses are designated $\Delta T1$. These pulses are accumulated in a binary number in the section $\Delta T1$, which extends from P4–P1 bit times in the register. The section $\Delta T1$ is spaced two bit times from the section $\Delta \dot{Z}$, and it is spaced one bit time from the end of the word, as shown in FIGURE 3. Other information is stored in the P0 and P5 bit time positions in the register, designated $\Delta t_{200}$ and $\Delta t_{800}$, respectively. The significance of the information will be described subsequently.

The Yo register track has an appropriate write head associated with it, and a write amplifier 38 is coupled to that write head. The inputs to the write amplifier 38 are designated $y_0$ and $\bar{y}_0$. A first read head for the Yo register track is spaced along the track from the write head a distance corresponding to thirty-two word times, and the first read head is coupled to a read amplifier 42. The read amplifier 42 is, in turn, coupled to a flip-flop YO2. This flip-flop produces output terms YO2 and $\overline{YO2}$. A second read head for the Yo register track is spaced along the track from the write head a distance corresponding to eight word times. The latter read had is coupled to a read amplifier 40. The read amplifier 40, in turn, is coupled to a flip-flop YO1. The latter flip-flop develops the output terms YO1 and $\overline{YO1}$.

The sector address channel (Sot), as noted above, has sector words in the form of binary numbers recorded in it. These sector words constitute the respective addresses of the dicerent sectors of the particular memory drum 10 illustrated, for example, in FIGURE 1. These sectors number sixty-four in a constructed embodiment of the invention.

The sector word in each sector of the Sot track may also be used for controlling the auxiliary computer of the invention. For example, the P0–P2 bit positions of each successive sector word in the Sot track (which are not needed for the identification of sectors) may be used to store orders for the auxiliary computer in accordance with a pre-arranged program. Also, the P24–P15 bit positions in each of the sector words in the Sot track (which are also not needed for the identification of sectors) may be used to store other controls for the auxiliary computer, as will be described.

The auxiliary computer orders recorded at the P2–P0 bit positions in each sector of the Sot track on the magnetic memory drum 10 of FIGURE 2 are used to control a group of phase control flip-flops K4, K5, K6 (FIGURE 1) in the auxiliary computer. The configuration of these flip-flops determines which of a plurality of different phases of the auxiliary computer is to be executed at any particular time.

The phase control flip-flops K4, K5 and K6 are set simultaneously at P0 time in accordance with the orders stored in the sector word read into the flip-flop (Sot) of FIGURE 1 at the previous P2, P1 and P0 bit times. This assumes that the information flowing through the main computer is in serial form and that it flows in a sequence during each word time from P24 to P0 bit times, for this reason, the P2 and P1 bits of each sector word must be stored temporarily until P0 time, so that the three bits may be used simultaneously to set the flip-flops K4, K5 and K6, respectively, at P0 bit time. The temporary storage may be stored in any convenient manner.

For example, a bit counter 13 (FIGURE 1) is used in the system, and the flip-flops of the bit counter may be time shared to store this information.

The bit counter 13 may be composed of a plurality of flip-flops T1, T2, T3, T4 and T5.

The bit counter 13 is controlled by the clock pulses from the memory drum, and it is included in the general purpose computer to provide bit timing pulses P0–P24 for identifying the various bit times in each computer word during normal operation of the general purpose computer. The bit counter 13 is also used to control the bit timing of the auxiliary computer.

Figure 7:
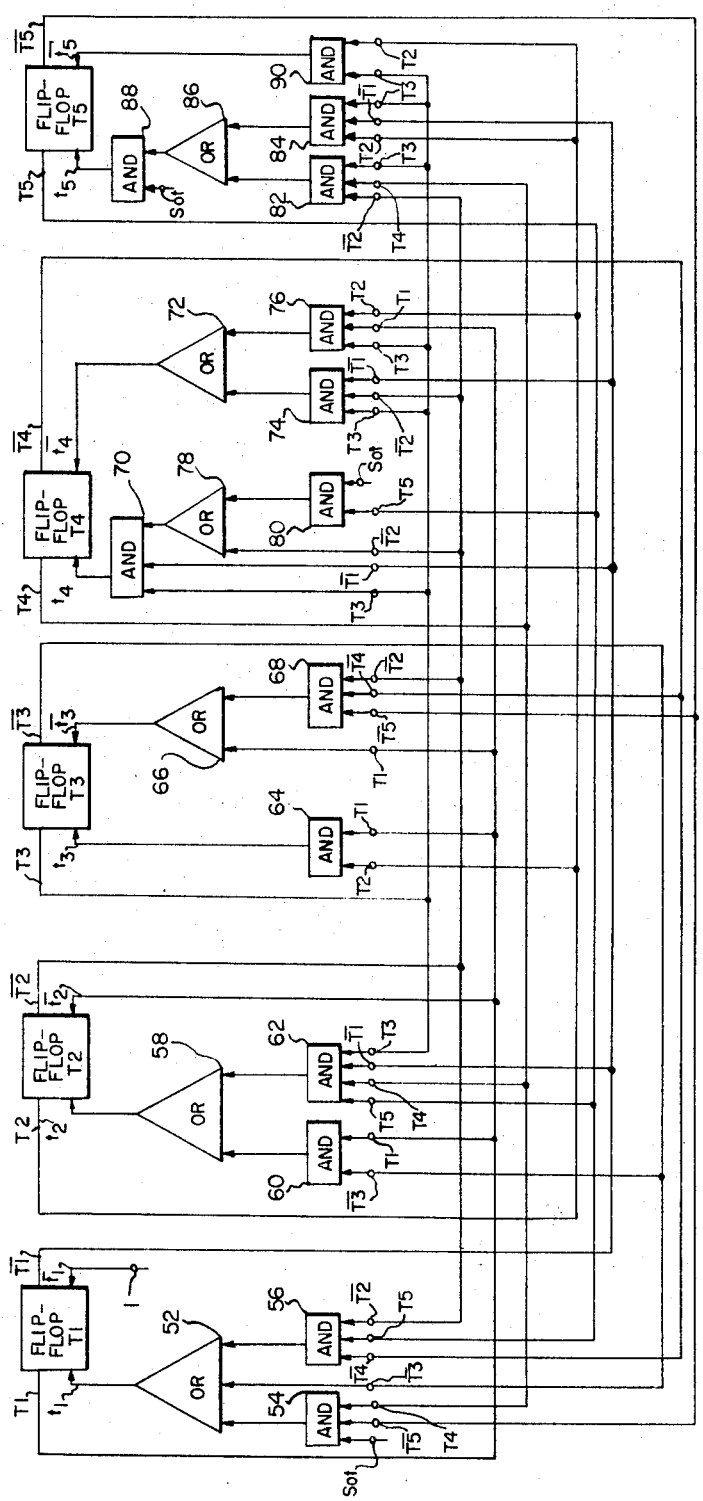
FIGURE 7 is a logic circuit diagram of a bit counter which is included in the circuitry of the main general purpose computer and which also is used for temporary storage for the input-output system.

The bit counter 13 is shown in logic detail in FIGURE 7, and it includes a plurality of flip-flops T1, T2, T3, T4 and T5. These flip-flops may be of any suitable type, and this particular type of network is well known to the electronic digital computer art. For that reason, a detailed circuit explanation of the individual flip-flops will not be included herein. It is also well understood that the different flip-flops includes cross connection terms, and that the flip-flops also have clock pulses introduced to them which perform the actual triggering. These cross connection terms and the clock pulses will be omitted from most of the circuitry and logic equations to be described herein so as to simplify the ensuing description.

The flip-flop (T1) of FIGURE 7 has an "or" gate 52 connected to its true input terminal $t_1$. The term $\overline{T3}$ is introduced to the "or" gate 52, and a pair of "and" gates 54 and 56 are connected to the "or" gate. The terms $\overline{T5}$, T4 and Sot are applied to the "and" gate 54. The terms T5, $\overline{T4}$ and $\overline{T2}$ are applied to the "and" gate 56. The flip-flop (T1) has the term "one" introduced to its false input terminal $\bar{t}_1$. This term represents that whenever the flip-flop (T1) is set true, it is returned to its false state by the following clock pulse.

An "or" gate 58 is connected to the true input terminal $t_2$ of the flip-flop (T2), and a pair of "and" gates 60 and 62 are connected to that "or" gate. The term $\overline{T3}$ and T1 are introduced to the "and" gate 60. The terms T5, T4, T3 and $\overline{T1}$ are introduced to the "and" gate 62. The term T1 is applied to the false input terminal $\bar{t}_2$ of the flip-flop T2.

An "and" gate 64 is connected to the true input terminal $t_3$ of the flip-flop (T3). The terms T1 and T2 are introduced to the "and" gate 64. An "or" gate 66 is connected to the false input terminal $\bar{t}_3$ of the flip-flop T3. The term T1 is introduced to the "or" gate 66, and an "and" gate 68 is also connected to that "or" gate. The terms $\overline{T2}$, $\overline{T4}$ and $\overline{T5}$ are all introduced to the "and" gate 68.

An "and" gate 70 is connected to the true inpute terminal of the flip-flop (T4), and an "or" gate 72 is connected to the false input terminal $\bar{t}_4$ of that flip-flop. A pair of "and" gates 74 and 76 are connected to the "or" gate 72. An "or" gate 78 is connected to the "and" gate 70, and an "and" gate 80 is connected to the "or" gate 78. The terms T3 and $\overline{T1}$ are introduced to the "and" gate 70. The term $\overline{T2}$ is introduced to the "or" gate 78. The terms T5 and Sot are introduced to the "and" gate 80. The terms T3, $\overline{T2}$ and $\overline{T1}$ are introduced to the "and" gate 74. The terms T3, T2, T1 are introduced to "and" gate 76.

The terms $\overline{T2}$, T3 and T4 are introduced to an "and" gate 82. The terms $\overline{T1}$, T2 and T3 are introduced to an "and" gate 84. The "and" gates 82 and 84 are connected to an "or" gate 86. The "or" gate 86 is connected to an "and" gate 88, and the term Sot is also applied to that "and" gate. The "and" gate 88 is connected to the true input terminal $t_5$ of the flip-flop (T5). The terms T2 and T3 are applied to an "and" gate 90, and that "and" gate is connected to the false input terminal $\bar{t}_5$ of the flip-flop (T5).

The "and" gates and "or" gates described above may take any suitable form, and such gates are well known to the electronic digital computer art. The output term of an "and" gate is true only when all its input terms are true. The output term of an "or" gate is true, on the other hand, when any one or more of its input terms is true.

The bit counter flip-flops may be controlled in accordance with the following logic equations:

$t_5 = Sot\ (T3 \cdot T4 \cdot \overline{T2} + T2 \cdot \overline{T1} \cdot T3)$
$\bar{t}_5 = T3 \cdot T2$
$t_4 = T3 \cdot \overline{T1}(\overline{T2} + T5 \cdot Sot)$
$\bar{t}_4 = T3 \cdot \overline{T2} \cdot \overline{T1} + T3 \cdot T2 \cdot T1$
$t_3 = T2 \cdot T1 \cdot \overline{T3}$
$\bar{t}_3 = T1 + \overline{T5} \cdot \overline{T4} \cdot \overline{T2}$
$t_2 = \overline{T3} \cdot T1 + T5 \cdot T4 \cdot T3 \cdot \overline{T1}$
$\bar{t}_2 = T1$
$t_1 = \overline{T3} + \overline{T5} \cdot T4 \cdot Sot + T5 \cdot \overline{T4} \cdot \overline{T2} + \overline{T5} \cdot T2$
$\bar{t}_1 = 1$ The logic equations control the flip-flops T1–T5 so that the bit counter has successive configurations as the magnetic memory drum 10 rotates, and it identifies the intervals between successive clock pulses. The bit counter 13 normally counts bit times for each sector of the memory drum, these bit times extending from P24 to P0.

The control of the bit counter 13 is such that it may be synchronized with the magnetic memory drum 10 of FIGURE 1 without the need for separate synchronizing bits on the drum, and without the need for extraneous circuitry to respond to the reading of such bits. The information recorded in the S$ot$ sector address track of the drum is recorded in a manner such that the P15 bit position in each sector of the S$ot$ track is the only bit position at which a binary 1 appears at every word time.

When the bit counter 13 reaches its P15 configuration, it can proceed to the P14 configuration only if the S$ot$ bit is a 1. Only then can the flip-flop T1 be set by the term $\overline{T5} \cdot T4 \cdot Sot$, and only then can the flip-flop T5 be set by the term $Sot \cdot T3 \cdot T4 \cdot \overline{T2}$. If the bit in the corresponding sector of the S$ot$ track is a 0 at this time indicating that the drum is not at its P15 bit position for the corresponding word time, the flip-flop T1 remains reset and the flip-flop T5 also remains reset. This causes the bit counter to assume a configuration $\overline{T5} \cdot \overline{T4} \cdot T3 \cdot \overline{T2} \cdot \overline{T1}$.

This latter configuration of the bit counter 13 corresponds to the P20 bit time. The bit counter, therefore, steps back five steps when it assumes its P15 bit position and a 0 is encountered at the corresponding bit position in the S$ot$ track. At the same time the drum 10 moves ahead one step. This results in a six step difference between the bit counter and the drum.

The action described in the preceding paragraph continues until the P15 configuration of the bit counter 13 corresponds with the P15 bit position in each sector word in the S$ot$ track on the drum. It should be noted, that because the above described six-step shift between the bit counter 13 and the memory drum 10 (which occurs each time the P15 configuration of the bit counter is reached without synchronization with the drum) is not a sub-multiple of the total twenty-five bit counter configurations, each bit position of a word on the S$ot$ track will be tested for synchronizing purposes before any particular bit position is tested twice. This means that the greatest time required to achieve synchronization between the bit counter and the memory drum corresponds to twenty-five revolutions of the drum.

The term $Sot \cdot T2 \cdot \overline{T1} \cdot T3$ permits the flip-flop T5 to hold the S$ot$ information at P0 bit time in accordance with the corresponding bit of the auxiliary computer order stored at the P1 bit position in the corresponding sector word on the S$ot$ track of the magnetic memory drum. Likewise, the term $Sot \cdot T3 \cdot \overline{T1} \cdot T5$ permits the flip-flop T4 to hold the S$ot$ information at P1 bit time in accordance with the P2 bit of the auxiliary computer order stored in the corresponding sector word.

The flip-flops T4 and T5, as mentioned above, serve as a temporary storage for the P2 and P1 bits of the different auxiliary computer instructions, these bits being stored at the P2 and P1 bit positions of the successive sector words in the S$ot$ track. These flip-flops introduce the bits at P0 time to the phase control flip-flops K4 and K5. At the same time, the third bit of the corresponding auxiliary computer instruction which is stored at the P0 bit position of the sector word in the S$ot$ track is introduced to the phase control flip-flop K6.

The phase control flip-flops K4, K5 and K6 identifies the different phases of operation for the auxiliary computer. These phases will be described, and in the embodiment under consideration, there are eight different phases. These phases are represented by different states of the flip-flops K4, K5 and K6, as shown in the table of FIGURE 5.

Figure 8:
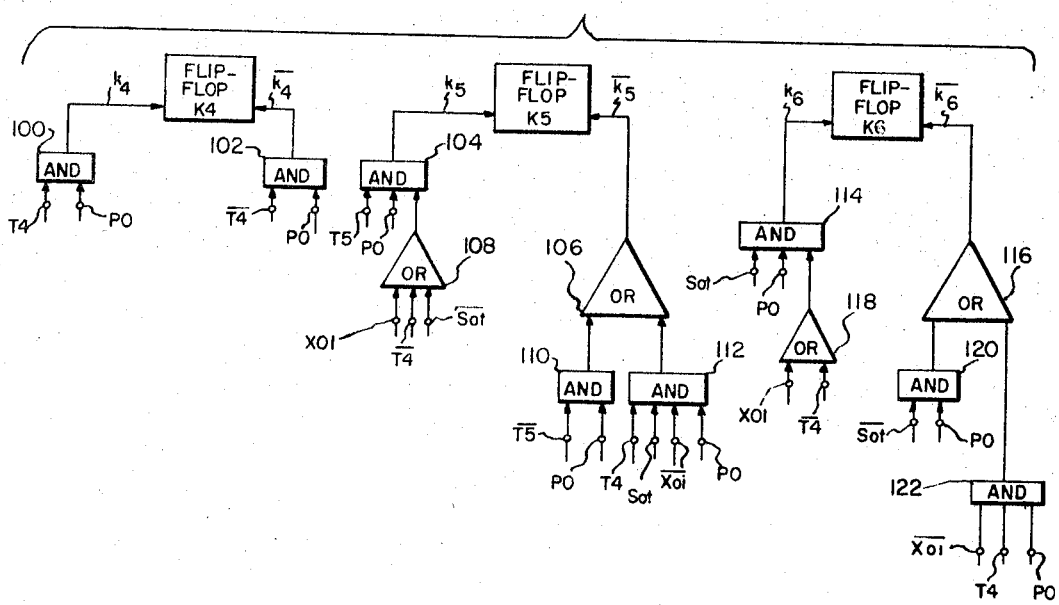
FIGURE 8 illustrates a group of control flip-flops for the input-output system and the logic circuitry associated therewith.

The flip-flops K4, K5 and K6 are shown in logic detail in FIGURE 8. An "and" gate 100 is connected to the true input terminal $k_4$ of the flip-flop (K4), and an "and" gate 102 is connected to the false input terminal $\overline{k_4}$ of that flip-flop. The terms T4 and P0 are applied to the "and" gate 100. The terms $\overline{T4}$ and P0 are applied to the "and" gate 102.

An "and" gate 104 is connected to the true input terminal $k_5$ of the flip-flop (K5), and an "or" gate 106 is connected to the false input terminal $\overline{k_5}$ of that flip-flop. An "or" gate 108 is connected to the "and" gate 104, and a pair of "and" gates 110 and 112 are connected to the "or" gate 106. The terms T5 and P0 are introduced to the "and" gate 104. The terms XO1, $\overline{T4}$ and $\overline{Sot}$ are applied to the "or" gate 108. The terms $\overline{T5}$ and P0 are applied to the "and" gate 110. The terms T4, S$ot$, $\overline{XO1}$ and P0 are applied to the "and" gate 112.

An "or" gate 114 is connected to the true input terminal $k_6$ of the flip-flop (K6), and an "or" gate 116 is connected to the false input terminal $\overline{k_6}$ of that flip-flop. The terms S$ot$ and P0 are introduced to the "and" gate 114. An "or" gate 118 is also connected to that "and" gate, and the terms XO1 and $\overline{T4}$ are introduced to the "or" gate 118. A pair of "and" gates 120 and 122 are connected to the "or" gate 116. The terms $\overline{Sot}$ and P0 are applied to the "and" gate 120. The terms $\overline{XO1}$, T4 and P0 are applied to the "and" gate 122.

The logic associated with the phase control flip-flops K4, K5 and K6 may be expressed as follows:

$K4 = T4 \cdot P0$
$\overline{K4} = \overline{T4} \cdot P0$
$k_5 = T5 \cdot P0(XO1 + \overline{T4} + \overline{Sot})$
$\overline{k_5} = \overline{T5} \cdot P0 + \overline{T4} \cdot Sot \cdot \overline{XO1} \cdot P0$
$k_6 = Sot \cdot P0(XO1 - \overline{T4})$
$\overline{k_6} = \overline{Sot} \cdot P0 + \overline{XO1} \cdot T4 \cdot P0$ It is evident, therefore, that the phase control flip-flops K4, K5 and K6 are controlled in accordance with the information stored at P0 time in the T4 and T5 flip-flops, and in the corresponding word of the S$ot$ track. These phase control flip-flops K4, K5 and K6 hold the corresponding auxiliary computer order from the S$ot$ track at P24 bit time.

As shown in FIGURE 2, and as mentioned above, the X$o$ register has a plurality of read heads A, B, C and D which are coupled to the X$o$ track on the memory drum 10 at spaced positions along the track for reasons to be described. These read heads are selectively connected to the read amplifier 36 under the control of a pair of flip-flops W1 and W2 (FIGURE 2).

The flip-flops W1 and W2 are controlled by information stored in the S$ot$ track at P20 and P21 bit positions in successive sector words. For each selection, a desired one of four different possible combinations of the flip-flops W1 and W2 is set up. This setting of the flip-flops W1 and W2 is carried out one word time prior to the execution of the corresponding phase of operation of the auxiliary computer, and maintained during the execution of the particular phase.

As shown in FIGURE 9, an "and" gate 150 is connected to the true input terminal $w_1$ of the flip-flop (W1) and an "and" gate 152 is connected to the false input terminal $\overline{w_1}$. It is to be understood that these "and" gates will be or'd with other gates which are included in logic sharing the flip-flop (W1), and that this applies also to the flip-flops (W2), (W4) and (W5), to be described in conjunction with FIGURES 8 and 10. The terms S$ot$ and P20 are introduced to the "and" gate 150. The terms $\overline{Sot}$ and P20 are introduced to the "and" gate 152. An "and" gate 154 is connected to the true input terminal $w_2$ of the flip-flop (W2), and an "and" gate 156 is connected to the false input terminal $\overline{w_2}$ of that flip-flop. The terms S$ot$ and P21 are introduced to the "and" gate 154. The terms $\overline{Sot}$ and P21 are introduced to the "and" gate 156.

The word counter flip-flops (W4) and (W5) of the main computer may be used by the input-output system of the invention as an input-output capacitor memory control, as will be described. The flip-flop (W5) is set true for an output function, for example. The flip-flop (W4) is set true if an output is to be selected from the Y2 register, and that flip-flop is set false if an output is to be selected from a storage register of the main computer. These flip-flops are controlled by information from the S$ot$ track, as shown by the logic in FIGURE 10.

As illustrated in FIGURE 10, an "and" gate 158 is connected to the input terminal $w_4$ of the flip-flop (W4), and an "and" gate 160 is connected to the false input terminal $\overline{w_4}$. The terms S$ot$ and P23 are introduced to the "and" gate 160, an "or" gate 161 is connected to the input terminal $w_5$ of the flip-flop (W5). An "and" gate 162 is connected to the "or" gate 161, and an "and" gate 163 is also connected to that "or" gate. The terms S$ot$ and P24 are introduced to the "and" gate 162. The terms $\overline{K4}$, K5, K6, W1, W2 and F$o$ are introduced to the "and" gate 163. An "or" gate 165 is also connected to the "and" gate 163. The terms P23 and P22 are introduced to the "or" gate 165. The term P0 is introduced to the false input terminal $\overline{w_5}$ of the flip-flop (W5). The term F$o$ is derived from an emitter follower circuit to be described in conjunction with FIGURE 22.

Several of the phases of the auxiliary computer are interdependent upon one another, and it is for that reason that the terms X$o$1 and $\overline{Xo1}$ appearing in the above logic equations are used in the control of the phase control flip-flops K4 and K5. This specific inter-related control of the different phases will be discussed subsequently. At this point, the different phases of operation, of which the embodiment of the invention being considered is capable, will be discussed briefly. These phases, as described above, are under the control of the flip-flops K4, K5 and K6.

The inputs to the phase control flip-flops K4, K5 and K6 are set to a particular configuration at the P0 bit time preceding the corresponding operational phase to be carried out, and the phase control flip-flops assume the required configuration at the P24 bit time at the beginning of the particular operational phase and remain in that configuration throughout the following word time during which the particular operational phase is being carried out. As described above, the phase control flip-flops K4, K5 and K6 are controlled by the auxiliary computer orders recorded on the S$ot$ track of the memory drum 10. For airborne uses, for example, the program is established on the ground and the auxiliary computer system proceeds from operational phase to operational phase during the operation of the equipment, independent of any control by the pilot.

Suitable input units are provided for the system which feed random pulse inputs to the auxiliary computer. These pulse inputs may represent, for example, positive or negative velocity increments of the vehicle carrying the equipment on three axes. Other pulses (T$_s$) may also be fed into the auxiliary computer which represent time standard pulses. These time standard pulses (T$_s$) may be derived from the general purpose computer 12 in the manner explained in Patent 3,074,638, referred to above, and as will be described herein. When the time standard pulses (T$_s$) are summed, an indication of elapsed time from a given reference is provided.

The X$o$ register is a one word register, as described and its output passes through the flip-flop X$o$1. This output is circulated through the one-increment adder-subtracter network AA in the circulating circuit of the register, so that received pulse inputs may be added to or subtracted from the previous contents of the X$o$ register. This action is shown in FIGURE 4A. The result of this addition-subtraction process produces the inputs $x_0$, $\overline{w}_0$ of the write amplifier 32. The inputs represent the summation number $\Delta \dot{X}$, $\Delta \dot{Y}$, $\Delta \dot{Z}$ and $\Delta T_1$. These numbers are segregated in the X$o$ register to assume the bit positions illustrated in FIGURE 3.

The X$o$ register functions, therefore, as a fast accumulator for the random pulse inputs, and it stores binary numbers representative, for example, of the velocity increments of the vehicle in which the computer is installed, and which increments take place along the X, Y and Z axes respectively.

All the operations actually to be performed by the auxiliary computer of the invention, as it operates in its different operational phases, are performed in conjunction with the Y$o$ register. The auxiliary computer also controls the manner in which the Y$o$ register accepts information from the X$o$ register.

In this latter respect, it should be pointed out that the read heads A, B, C and D associated with the X$o$ register are positioned so that the information read into the flip-flop X$o$1 will have a particular bit timing regardless of the different bit positions at which the different pieces of that information were originally stored in the X$o$ register. That is, the different $\Delta \dot{X}$, $\Delta \dot{Y}$, $\Delta \dot{Z}$ and $\Delta T_1$ numbers in the X$o$ register are selectively read out of the X$o$ register and through the X$o$2 flip-flop at the same bit times.

The first operational phase to be performed by the particular embodiment of the auxiliary computer to be described is designated $\phi 1$. The phase $\phi 1$, as shown in FIGURE 4B, serves to cause the Y$o$ register to accept from the X$o$ register the summations $\Delta \dot{X}$, $\Delta \dot{Y}$ and $\Delta \dot{Z}$ of the random velocity increment pulse input, and to add these inputs to previously accumulated quantities $\dot{X}$, $\dot{Y}$ and $\dot{Z}$ contained at different word positions in the Y$o$ register. This operational phase is carried out by feeding the contents of the flip-flops X$o$2 and Y$o$2 into the two input adder BB, the output of which forms the input $y_0$, $\overline{y}_0$ of the write amplifier 38 of FIGURE 2.

The read amplifier 42, for example, reads the value of the function $\dot{X}$ from the Y$o$ register and feeds that information through the flip-flop Y$o$2. At the same time, the read amplifier 36 is selected by the flip-flops $W_1$ and $W_2$ so that it reads the binary number corresponding to the increment $\Delta \dot{X}$ from the X$o$ register and feeds that information through the flip-flop X$o$2. This action permits the two quantities to be added algebraically to one another, with the result being returned to the proper position in the Y$o$ register.

In like manner the increments $\Delta \dot{Y}$, $\Delta \dot{Z}$ and $\Delta T_1$ from the X$o$ register may be added to the functions Y, Z and $T_1$ in the Y$o$ register. In each instance, the position of the different read heads A, B, C and D associated with the X$o$ register are such that when these heads are selectively coupled to the read amplifier 36, under the control of the flip-flops $W_1$ and $W_2$, the different increments have the proper bit positions to be added to the least significant bit positions of their corresponding functions which are stored in different word positions, in the Y$o$ register.

The X$o$ register is cleared once each half revolution of the drum 10, for example, and there are four first phase ($\phi 1$) operations (each for a different increment from the X$o$ register) for each half revolution of the drum. For each increment of the X$o$ register, the $\phi 1$ operational phase continues for one word time. During the P24–P19 bit times of that word time, the $\Delta \dot{X}$, $\Delta \dot{Y}$, $\Delta \dot{Z}$, or $\Delta T_1$ information is read through the flip-flop X$o$2. During the remainder of the word time, the flip-flop X$o$2 holds the sign digit of the particular increment being transferred from the X$o$ register to the Y$o$ register.

The second operational phase ($\phi 2$), as shown in FIGURE 4C, integrates some function relative to real time. For control purposes, a series of time pulses $\Delta t_{200}$ is placed in the P0 bit positions in the X$o$ register, in a manner to be described, and successive ones of these pulses may occur, for example, each 1/200 seconds of elapsed real time. The function to be time integrated passes through the flip-flop Yo1 at the same time the previous summation passes through the flip-flop Yo2, and the outputs of these two flip-flops are passed through the two-input adder BB to form the input $y_0$, $\bar{y}_0$ for the write amplifier 38.

The function to be integrated during the $\phi2$ phase may be any one of the velocity terms, $\dot{X}$, $\dot{Y}$ or $\dot{Z}$, for example, stored in the Yo register. These time integrations provide incremental distance terms $\dot{X}\Delta t$, $\dot{Y}\Delta t$ and $\dot{Z}\Delta t$, and these incremental distance terms may be added to the previously accumulated distance terms X, Y and Z, in the manner described above. Alternately, the functions to be time integrated may be some function from the general purpose computer 12, and that function is stored in the Yo register for such integration. The integrations may proceed, for example, at the rate of 200 per second under the control of the time pulses $\Delta t_{200}$ at the P0 bit positions in the Xo register.

The third operational phase ($\phi3$) of the auxiliary computer of the invention involves an operation which is required when the integral (summations) of some function during the $\phi2$ operational phase requires a double length register to hold the accumulated information. In such a case, for example, the accumulated distance information X may comprise two words in length, and the incremental distance expression $\dot{X}\Delta t$ to be added to or subtracted from the accumulated distance may be one word in length.

For the $\phi3$ operational phase, and during the second word time thereof, the continuation of the incremental $\dot{X}\Delta t$ sign digit must be obtained to add into the most significant half of the binary number representing the accumulated distance. To achieve this, the inputs to the flip-flop Yo2 are disqualified at the completion of the $\phi2$ operation, so that the sign digit of the function to be integrated may be held in the flip-flop Yo2 for the duration of the $\phi3$ phase. Also, any carries to be propagated are provided by the carry flip-flop of the two input adder BB referred to above, which flip-flop is designated C3 (FIGURES 1 and 4C). That is, the flip-flop Yo2 is fed in accordance with the sign digit of the terms $\dot{X}\Delta t$, $\dot{Y}\Delta t$, or $\dot{Z}\Delta t$ at P0 bit time of the $\phi2$ operational phase, and it holds the sign digits during the entire duration of the $\phi3$ phase.

For data link operation, the word to be transmitted must be precessed, such that at each word time a different bit position is available to be detected. A fourth operational phase $\phi4$ (FIGURE 4D) causes the word read from the flip-flop Yo2 to be shifted one bit to the left each time it is circulated, that is, for each half-drum revolution. This is accomplished by adding the number to itself in the two input added BB. The sign digit is the first bit to be detected at P24 bit time, then the most significant bit is detected, and so on. This continues until 25 computer cycles have elapsed so that the least significant bit is read 25 word times later at P0 bit time.

During the fifth operational phase $\phi5$ (FIGURE 4E), information is read from the flip-flop Yo1 and introduced to the write amplifier 38 as its input $y_0$, $\bar{y}_0$ to form an eight word recirculating loop. This mode is required, for example, to provide a capability in the auxiliary computer 14 for counting some cut-off velocity down to zero in accordance with real time.

The eight word recirculating loop requires a time control pulse occurring at a repetition rate of 800 pulses per second, and these time control pulses are placed in the P5 bit positions of the Xo register ($\Delta t_{800}$) (FIGURE 3). The manner in which the $\Delta t_{800}$ and the $\Delta t_{200}$ time control pulses are respectively placed in the P0 and P5 bit positions of the Xo register will be explained subsequently. For the $\phi5$ operational phase operation, the value of the function to be reduced to zero is placed as a negative number in the Yo register, and the $\Delta t_{800}$ time control pulses are added as $+1$ or $+2$ carries which count the function up to zero so as to provide a sign change at P0 bit time for the cut-off point.

The sixth operational phase ($\phi6$) is a thirty-two word recirculation operation, as mentioned above, and as shown schematically in FIGURE 4F. In the $\phi6$ phase, the flip-flop Yo2 feeds the input $y_0$, $\bar{y}_0$ to the write amplifier 38. This is to provide a periodic recirculation to the functions stored in the Yo register, when such a recirculation is required, and as will be explained.

The seventh operational phase ($\phi7$), as shown in FIGURE 4G, permits certain analog-to-digital input functions to be accepted by the Yo register. The contents of a scan flip-flop M$n$ of an analog-digital converter 39 (FIGURE 1), as described in the aforementioned copending application Ser. No. 1,969, are read directly into the write amplifier 38 of the Yo register during this phase.

The eighth operational phase ($\phi8$) is an operation for propagating to the second word of a double length function, a carry from the first word. This eighth phase is used, for example, to restore the value of real time $T_1$ in the Yo register. Two word times are required to store the $T_1$ term in the Yo register, and there is often a need for a carry to be propagated to the second word of the double length function.

As mentioned above, the time integrating operation of the $\phi2$ operational phase is controlled by a series of 1/200 second time control pulses $\Delta t_{200}$ which are stored at the P0 bit positions in the Xo register (FIGURE 3), and which are stored in the Xo1 flip-flop at P0 bit time. Each time a $\phi2$ phase time integration is to be carried out, the presence of such a $\Delta t_{200}$ time control pulse in the Xo1 flip-flop at P0 bit time permits the time integration to proceed. However, the absence of a $\Delta t_{200}$ pulse at P0 bit time causes the flip-flop Xo1 to be reset at that time. Then, even though a time integration phase $\phi2$ is ordered by the information in the Sot track of the memory drum, no time integration will occur.

Instead, the information in the Yo register representing the corresponding accumulated distance will be circulated without any integration. This causes the time integration of the function to be carried out in a timed relationship with real time, as represented by the time control pulse $\Delta t_{200}$ at the P0 bit position in the Xo register, rather than in timed relationship with the rotation of the drum 10.

It will be appreciated that from time to time a time control pulse $\Delta t_{200}$ will be omitted from the P0 bit position in the Xo register, in a manner to be described, so as to maintain this desired real time relationship. The aforesaid recirculation is caused by forcing the phase control flip-flops K4, K5 and K6 into a $\phi6$ operational phase configuration in the presence of a $\phi2$ operational phase instruction, if the flip-flop Xo1 is reset, rather than permitting the phase control flip-flops to assume the ordered $\phi2$ phase configuration.

The phase control flip-flops K4, K5 and K6 must assume a K4·$\overline{K5}$·K6 configuration (FIGURE 5) if the $\phi2$ phase is to be carried out. For this purpose, the terms T4·P0, $\overline{T5}$·P0, are set true by the phase $\phi2$ instruction. This causes the flip-flop K4 to be set, and also causes the flip-flop K5 to be reset. However, the flip-flop K6 is set only if the term Xo1 is true, otherwise the flip-flop K6 is reset.

Therefore, the phase control flip-flops K4, K5 and K6 may assume the K4·$\overline{K5}$·K6 configuration for the $\phi2$ operation, only if the flip-flop Xo1 is set at P0 bit time, indicating the presence of a $\Delta t_{200}$ time control pulse. Otherwise, the flip-flops K4, K5 and K6 are set to the K4·$\overline{K5}$·$\overline{K6}$ configuration, this being the configuration required to establish the recirculation phase $\phi6$.

It follows that when a time integration phase $\phi2$ has been skipped in a manner described above, an accompanying $\phi3$ operational phase, if present, must also be skipped. For the $\phi3$ operational phase to be established, the terms T4·P0, T5·P0 and Sot·P0 are set by the $\phi3$ phase instruction from the Sot track. For the $\phi 3$ phase to be carried out, the phase control flip-flops K4, K5 and K6 must all be set (FIGURE 5).

However, the term T5·P0 can set the K5 flip-flop only if the term Xo1 is true. Likewise, the term Sot can set the K6 flip-flop only if the term Xo1 is true. If the term Xo1 is false in the presence of the $\phi 3$ operational phase instruction, the flip-flop K5 is reset, and the flip-flop K6 is reset. Therefore, again the flip-flops K4, K5 and K6 are set to the $\phi 6$ circulation phase configuration in the absence of a $\Delta t_{200}$ time control pulse and in the presence of a $\phi 3$ phase instruction.

Pulses representing positive and negative velocity changes on the X, Y and Z axes are derived, for example, from a stable platform unit in accordance with known practice. These positive and negative pulses are fed to a series of incremental flip-flops (V1-V6) (FIGURE 1).

These incremental flip-flops are also used (on a time shared basis) with other flip-flops in the shift register and countdown counter of FIGURE 6, as will be described, for a further purpose. The shift register and count-down counter of FIGURE 6 includes not only the flip-flops V1-V6, but it also includes the incremental adder flip-flops C4 and C5, and the time standard flip-flop TS, all these being time shared. The most significant bit is stored in the flip-flop V5, and the least significant bit is stored in the flip-flop C5. The intermediate bits are stored in the other flip-flops of FIGURE 6, in the following order: V6, TS, V3, V4, V1, V2 and C4.

In some applications, it is desirable to de-energize the general purpose computer 12 and auxiliary computer 14 after a certain time interval has elapsed. The computers 12 and 14 then remain de-energized for a predetermined time interval, and they are again energized after that time interval has elapsed. The pre-determined time interval during which the computers are de-energized may be established by a corresponding multi-bit number stored in the shift register and counter of FIGURE 6, which number is subsequently counted down to zero for the predetermined interval during which the computer 12 is de-energized. This operation may be under the control of a flip-flop H. When the flip-flop H is reset, the general purpose computer and its associated systems operate in a normal manner. However, when the flip-flop H is set, the computer is conditioned to exclude normal inputs, and it is subsequently de-energized. This de-energizing of the computer occurs when a term Fe becomes false, at which time the magnetic memory drum 10 of FIGURE 2 slows down to a stop, and no more clock pulses T are produced.

When the flip-flop H is set, a multi-bit binary number representing the predetermined time interval during which the computer is to be de-energized, is shifted into the register of FIGURE 6. This shifting operation is under the control of the term Fe. Then, when the term Fe goes false, indicating that the number is in the register, the register becomes a counter and the number is counted down to zero. The computer is de-energized while the count-down of the counter of FIGURE 6 is proceeding. The count-down is under the control of time control pulses $\Delta t_2$.

The time control pulses $\Delta t_2$ are derived from a frequency divider 41 which is coupled to a time standard precision frequency source 43. This source 43 and the flip-flops forming the register-counter of FIGURE 6 are energized from an auxiliary power source during the interval when the general purpose computer 12 and auxiliary computer 14 are de-energized. The $\Delta t_2$ pulses may have a repetition frequency, for example, of one every 200 seconds.

The frequency divider 41 producing these time control pulses may be of the magnetic core type, such as presently designated "Incremag."

The stable platform unit supplies asynchronous pulses relative to the clock rate of the computer to the flip-flop V1 for positive increment in velocity along the X axis; and the stable platform supplies other asynchronous pulses to the flip-flop V2 for negative velocity increments along the X axis. Likewise, the stable platform supplies asynchronous pulses to the flip-flop V3 for positive velocity increments along the Y axis, and its supplies asynchronous pulses to the flip-flop V4 for negative velocity increments along the Y axis. Likewise, the stable platform supplies asynchronous pulses to the flip-flop V5 for positive velocity increments along the Z axis, and it supplies asynchronous pulses to the flip-flop V6 for negative velocity increments along that axis.

The manner in which the stable platform mechanism supplies these pulses to the different incremental flip-flops V1-V6 is understood to the art, and the details of the mechanism for effectuating this will not be included herein. Pulses representing positive and negative velocity changes on the three axes are derived from a stable platform unit in accordance with the known practice. These pulses are fed to a series of incremental flip-flops (V1-V6) shown in FIGURES 11 and 12. These incremental flip-flops are also used independently, with other flip-flops in a shift register and count down counter, as shown in FIGURE 13 and which will be described. The shift register and count down counter, as shown in FIGURE 13, includes not only the flip-flops (V1-V6), but also includes the incremental adder carry flip-flops (C4) and (C5), and the time standard flip-flop ($T_S$). The most significant digit is stored in the flip-flop (V5) and the least significant digit is stored in the flip-flop (C5). The intermediate digits are stored in the remaining flip-flops of FIGURE 13, in the following order:

(V6), ($T_S$), (V3), (V4), (V1), (V2) and (C4)

In some applications it is desirable to de-energize the computer after a certain time interval has elapsed. The computer remains de-energized for a predetermined time interval, and it is then re-energized after that time interval has elapsed. The predetermined time interval during which the computer is de-energized may be established by a corresponding multi-digit binary number stored in the shift register of FIGURE 13, which number is subsequently counted down to zero for the predetermined interval during which the computer is de-energized. This operation may be under the control of a flip-flop (H) not shown, for example. When the flip-flop (H) is false, the general purpose computer and its associated systems operate in a normal manner. However, when the flip-flop (H) is set true, the computer is conditioned to exclude normal inputs. The computer is subsequently de-energized when a term F3 becomes false, at which time the magnetic memory drum 10 of FIGURE 1 slows down to a stop, and no more clock pulses T are produced.

When the flip-flop (H) is set true, a multi-digit binary number representing the predetermined time interval during which the computer is to be de-energized, is shifted into the register of FIGURE 13. This shifting operation is under the control of the term F3. Then, when the term F3 goes false, indicating that the number is in the register, the register becomes a counter and the number is counted down to zero. The computer is de-energized while the count down of the counter of FIGURE 13 is proceeding. The count down is under the control of time control pulses $\Delta t 2$. These time control pulses are derived from a frequency divider unit which is coupled to a time standard precision frequency source. This source and the flip-flops forming the register-counter of FIGURE 13 are energized from an auxiliary power source during the interval that the computers are de-energized. The $\Delta t 2$ pulses may have a repetition frequency, for example, of one every 200 seconds. The frequency divider producing these time control pulses may be of the magnetic core type, such as precisely designated "Incremag."

The logic associated with the incremental flip-flops (V1-V6) and with the one-increment adder-subtracter carry flip-flops (C4, C5), as well as the logic associated with the time standard flip-flop (T$_S$), will now be described in conjunction with FIGURES 11, 12, 14, 15 and 16.

The stable platform unit supplies asynchronous pulses relative to the clock rate of the computer to the flip-flop (V5) for positive velocity increments along a Z-axis, and The stable platform supplies similar asynchronous pulses to the flip-flop (V2) for negative velocity increments along the X-axis. Likewise, the stable platform supplies asynchronous pulses to the flip-flop (V3) for positive velocity increments along a Y-axis, and it supplies asynchronous pulses to the flip-flop (V4) for negative velocity increments along the Y-axis. In like manner, the stable platform supplies asynchronous pulses to the flip-flop (V5) for positive velocity increments along a X-axis, and it supplies asynchronous pulses to the flip-flop (V6) for negative velocity increments along that axis. The manner in which the stable platform mechanism supplies these pulses to the different incremental flip-flops (V1–V6) is understood to the art, and the details of the mechanism for effecting this will not be included herein. As mentioned previously, the flip-flop (C4) is set true for positive velocity increments along any of the three axes, and the flip-flop (C5) is set true for negative velocity increments along those axes. The flip-flops (C4) and (C5), in turn, control the one-increment adder-subtracter circuit to add or substract these velocity increments to the velocity increments already stored in the first accumulator register X$o$ for the first operational phase ($\phi$1).

Figure 12:
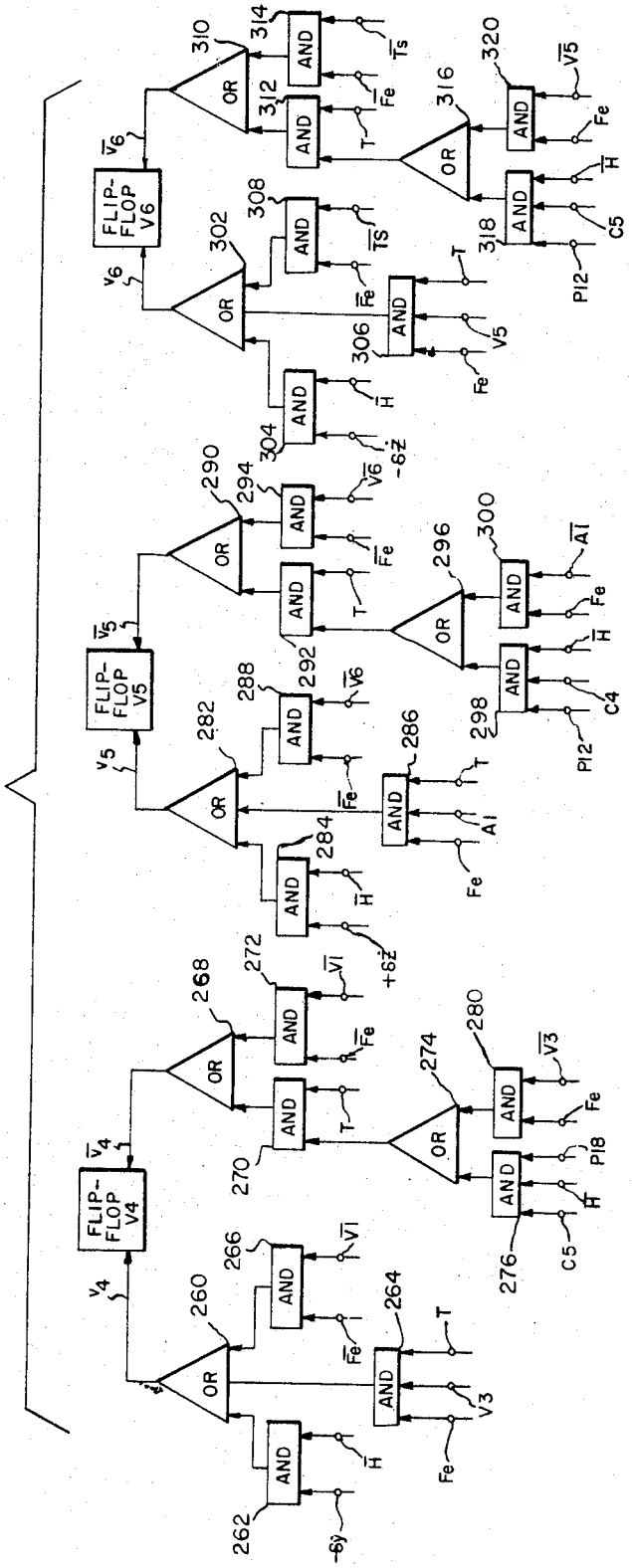
Figure 13:
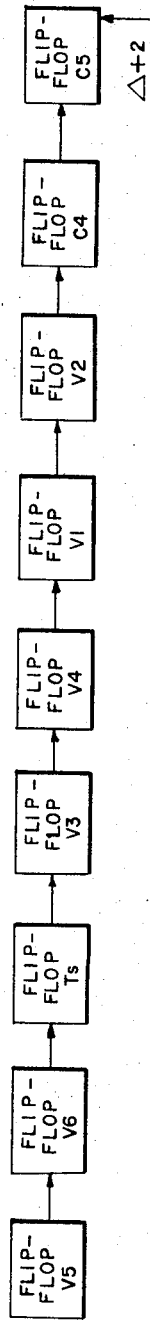
FIGURE 13 shows a group of flip-flops which are used to form a shaft register and converter for purposes to be described.

As noted above, the logic associated with the flip-flops (V1–V6) is illustrated in FIGURES 11 and 12. An "or" gate 200 is connected to the true input terminal of the flip-flop (V1) and an "or" gate 202 is connected to the false input terminal of that flip-flop. A plurality of "and" gates 204, 206 and 208 is connected to the "or" gate 200. The terms $+\sigma\dot{x}$ and $\overline{H}$ are applied to the "and" gate 204. The terms F3, V4 and T are applied to the "and" gate 206. The terms $\overline{Fe}$ and $\overline{V2}$ are applied to the "and" gate 208. The term $+\sigma\dot{x}$ represents the asynchronous pulses received from the inertial platform representative of positive velocity increments along the X-axis.

A pair of "and" gates 210 and 212 are connected to the "or" gate 202. An "or" gate 214 is connected to the "and" gate 210, and a pair of "and" gates 216 and 218 are connected to the "or" gate 214. The term T is applied to the "and" gate 210. The terms $\overline{Fe}$ and $\overline{V2}$ are introduced to the "and" gate 212. The terms $\overline{H}$, P24 and C4 are applied to the "and" gate 216. The terms F$e$ and $\overline{V4}$ are applied to the "and" gate 218.

An "or" gate 220 is connected to the true input terminal of the flip-flop (V2), and an "or" gate 222 is connected to the false input terminal of that flip-flop. A plurality of "and" gates 224, 226 and 230 are connected to the "or" gate 220. A pair of "and" gates 228 and 232 are connected to the "or" gate 222. An "or" gate 234 is connected to the "and" gate 228, and a pair of "and" gates 236 and 238 are connected to the "or" gate 234.

The terms $-\sigma\dot{x}$ and $\overline{H}$ are introduced to the "and" gate 224. The term $-\sigma\dot{x}$ represents the asynchronous pulses received from the inertial platform representative of negative velocity increments along the X-axis. The terms F$e$, T and V1 are introduced to the "and" gate 226. The terms $\overline{Fe}$ and $\overline{C4}$ are introduced to the "and" gate 230. The term T is applied to the "and" gate 228. The terms $\overline{Fe}$ and $\overline{C4}$ are applied to the "and" gate 232. The terms P24, $\overline{H}$ and C5 are applied to the "and" gate 236. The terms F$e$ and $\overline{V1}$ are applied to the "and" gate 238.

An "or" gate 240 is connected to the true input terminal $v3$ of the flip-flop V3. A plurality of "and" gates 242, 244 and 246 are connected to the "or" gate 240. The terms $+\sigma\dot{y}$ and $\overline{H}$ are introduced to the "and" gate 242. The terms F$e$, T$_S$ and T are introduced to the "and" gate 244. The terms $\overline{Fe}$ and $\overline{V4}$ are introduced to the "and" gate 246. The term $+\sigma\dot{y}$ represents the asynchronous pulse derived from the inertial platform representative of positive velocity increments along the Y-axis.

An "or" gate 248 is connected to the false input terminal $\overline{v3}$ of the flip-flop V3. A pair of "and" gates 250 and 252 are connected to the "or" gate 248. An "or" gate 254 is connected to the "and" gate 250, and the term T is also applied to the "and" gate. The terms $\overline{Fe}$ and $\overline{V4}$ are introduced to the "and" gate 252. A pair of "and" gates 256 and 258 are connected to the "or" gate 254. The terms C4, $\overline{H}$ and P18 are introduced to the "and" gate 256. The terms F$e$ and T$_S$ are introduced to the "and" gate 258.

The logic associated with the flip-flops V4, V5 and V6 is set out in FIGURE 12. An "or" gate 260 is connected to the true input terminal $v_4$ of the flip-flop V4 and a plurality of "and" gates 262, 264 and 266 are connected to the "or" gate 260. The terms $-\sigma\dot{y}$ and $\overline{H}$ are introduced to the "and" gate 262. The terms F3, V3 and T are introduced to the "and" gate 264. The terms $\overline{Fe}$ and $\overline{V1}$ are introduced to the "and" gate 266. The term $-\sigma\dot{y}$ represents the asynchronous pulses derived from the inertial platform representative of negative velocity increments along the Y-axis.

An "or" gate 268 is connected to the false input terminal $\overline{v_4}$ of the flip-flop V2. A pair of "and" gates 270 and 272 is connected to the "or" gate 268. An "or" gate 274 is connected to the "and" gate 270, and the term T is introduced to that "and" gate. The terms $\overline{Fe}$ and $\overline{V1}$ are introduced to the "and" gate 272. A pair of "and" gates 276 and 280 is connected to the "or" gate 274. The terms C5, $\overline{H}$ and P18 are introduced to the "and" gate 276. The terms F$e$ and $\overline{V3}$ are introduced to the "and" gate 280.

An "or" gate 282 is connected to the true input terminal $v5$ of the flip-flop V5. A plurality of "and" gates 284, 286 and 288 is connected to the "or" gate 282. The terms $+\sigma\dot{z}$ and $\overline{H}$ are introduced to the "and" gate 284. The terms F$e$, A1 and T are introduced to the "and" gate 286. The terms $\overline{Fe}$ and $\overline{V6}$ are introduced to the "and" gate 288. The term $+\sigma\dot{z}$ represents the asynchronous pulses derived from the inertial platform representative of positive velocity increments along the Z-axis.

An "or" gate 290 is connected to the false input terminal $\overline{v_5}$ of the flip-flop V5. A pair of "and" gates 292 and 294 are connected to the "or" gate 290. The term T is introduced to the "and" gate 292. The terms $\overline{Fe}$ and $\overline{V6}$ are introduced to the "and" gate 294. An "or" gate 296 is connected to the "and" gate 292, and a pair of "and" gates 298 and 300 is connected to the "or" gate 296. The terms P12, C4 and $\overline{H}$ are introduced to the "and" gate 298. The terms F$e$ and $\overline{A1}$ are introduced to the "and" gate 300.

An "or" gate 302 is connected to the true input terminal $v6$ of the flip-flop V6. A plurality of "and" gates 304, 306 and 308 is connected to the "or" gate. The terms $-\sigma\dot{z}$ and $\overline{H}$ are introduced to the "and" gate 304. The terms F$e$, V5 and T are introduced to the "and" gate 306. The terms F$e$ and T$_S$ are introduced to the "and" gate 308. The term $-\sigma\dot{z}$ represents the asynchronous pulses derived from the inertial platform representative of negative velocity increments along the Z-axis.

An "or" gate 310 is connected to the false input terminal $\overline{v6}$ of the flip-flop V6. A pair of "and" gates 312 and 314 is connected to the "or" gate 310. An "or" gate 316 is connected to the "and" gate 312, and the term T is introduced to that "and" gate. The terms F$e$ and T$_S$ are introduced to the "and" gate 314. A pair of "and" gates 318 and 320 are connected to the "and" gate 318. The terms F$e$ and $\overline{V5}$ are introduced to the "and" gate 320. The terms P12, C5 and $\overline{H}$ are introduced to the "and" gate 320.

Figure 14:
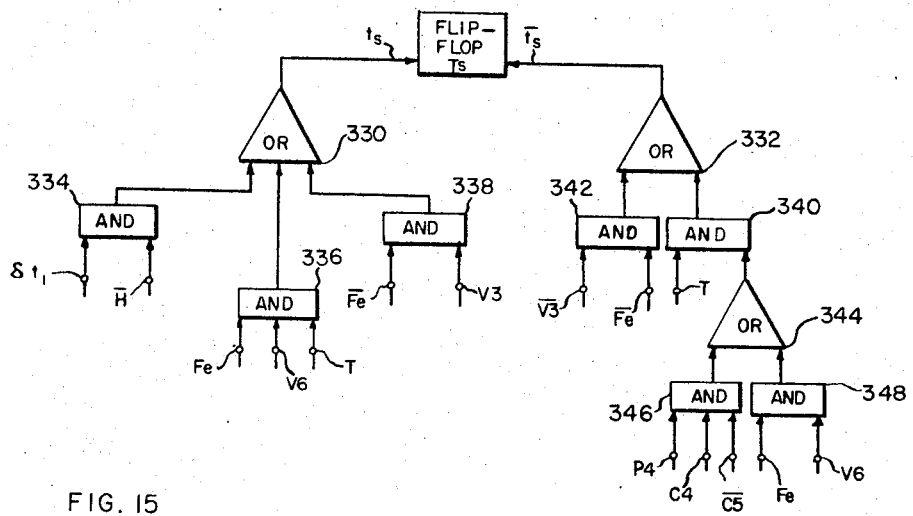
FIGURE 14 shows a time standard flip-flop and the logic associated therewith.

The logic associated with the time standard flip-flop (T_S) is shown in FIGURE 14. In that figure, an "or" gate 330 is connected to the true input terminal $t_S$ of the flip-flop, and an "or" gate 332 is connected to the false input terminal $\overline{t_S}$. A plurality of "and" gate 334, 336 and 338 is connected to the "or" gate 330. The terms $\sigma t_1$ and $\overline{H}$ are introduced to the "and" gate 334. The terms Fe, V6 and T are introduced to the "and" gate 336. The terms $\overline{Fe}$ and $\overline{V3}$ are introduced to the "and" gate 338. A pair of "and" gates 340 and 342 is connected to the "or" gate 332. The term T is introduced to the "and" gate 340, and the terms $\overline{Fe}$ and $\overline{V3}$ are introduced to the "and" gate 342. An "or" gate 344 is connected to the "and" gate 340, and a pair of "and" gates 346 and 348 is connected to the "or" gate 344. The terms P4, C4 and $\overline{H}$ are introduced to the "and" gate 346, and the terms Fe and $\overline{V6}$ are introduced to the "and" gate 348.

The logic associated with the incremental flip-flops V1–V6 of FIGURE 1, may be represented by the following logic equations:

$v_1 = (+\sigma\dot{x})\overline{H} + Fe \cdot V4 \cdot T + \overline{Fe} \cdot \overline{V2}$
$\overline{v_1} = (\overline{H} \cdot P24 \cdot C4 + Fe \cdot \overline{V4})T + \overline{Fe} \cdot \overline{V2}$
$v_2 = (-\sigma\dot{x})\overline{H} + Fe \cdot V1 \cdot T + \overline{Fe} \cdot \overline{C4}$
$\overline{v_2} = (P24 \cdot \overline{H} \cdot C5 + Fe \cdot \overline{V1})T + \overline{Fe} \cdot \overline{C4}$
$v_3 = (+\sigma\dot{y})\overline{H} + Fe \cdot T_S \cdot T + \overline{Fe} \cdot \overline{V4}$
$\overline{v_3} = (\overline{H} \cdot C4 \cdot \overline{T5} \cdot T4 \cdot \overline{T2} \cdot T1 + Fe \cdot \overline{T_S})T + \overline{Fe} \cdot \overline{V4}$
$v_4 = (-\sigma\dot{y})\overline{H} + Fe \cdot V3 \cdot T + \overline{Fe} \cdot \overline{V1}$
$\overline{v_4} = (\overline{H} \cdot C5 \cdot \overline{T5} \cdot T4 \cdot \overline{T2} \cdot T1 + Fe \cdot \overline{V3})T + \overline{Fe} \cdot \overline{V1}$
$v_5 = (+\sigma\dot{z})\overline{H} + Fe \cdot A1 \cdot T + \overline{Fe} \cdot \overline{V6}$
$\overline{v_5} = (T5 \cdot \overline{T4} \cdot \overline{T3} \cdot \overline{T2} \cdot T1 \cdot C4 \cdot \overline{H} + Fe \cdot \overline{A1})T + \overline{Fe} \cdot \overline{V6}$
$v_6 = (-\sigma\dot{z})\overline{H} + Fe \cdot \overline{V5} \cdot T + \overline{Fe} \cdot T_S$
$v_6 = (T5 \cdot \overline{T4} \cdot \overline{T3} \cdot \overline{T2} \cdot T1 \cdot C5 \cdot \overline{H} + \overline{Fe} \cdot \overline{V5})T + \overline{Fe} \cdot T_S$ The term $-\sigma\dot{x}$ represents the asynchronous pulses received from the inertial platform representative of negative velocity increments along the X axis. The term $+\sigma\dot{x}$ represents the asynchronous pulses received from the inertial platform representative of positive velocity increments along the X axis. Likewise, the term $+\sigma\dot{y}$ represents the asynchronous pulses derived from the inertial platform and representative of positive velocity increments along the Y axis, and the term $-\sigma\dot{y}$ represents the asynchronous pulses derived from the inertial platform representative of negative velocity increments along the Y axis.

It follows that the terms $+\sigma\dot{z}$ and $-\sigma\dot{z}$ represent the asynchronous pulses derived from the inertial platform respectively representing the positive and negative velocity increments along the Z axis.

Figure 15:
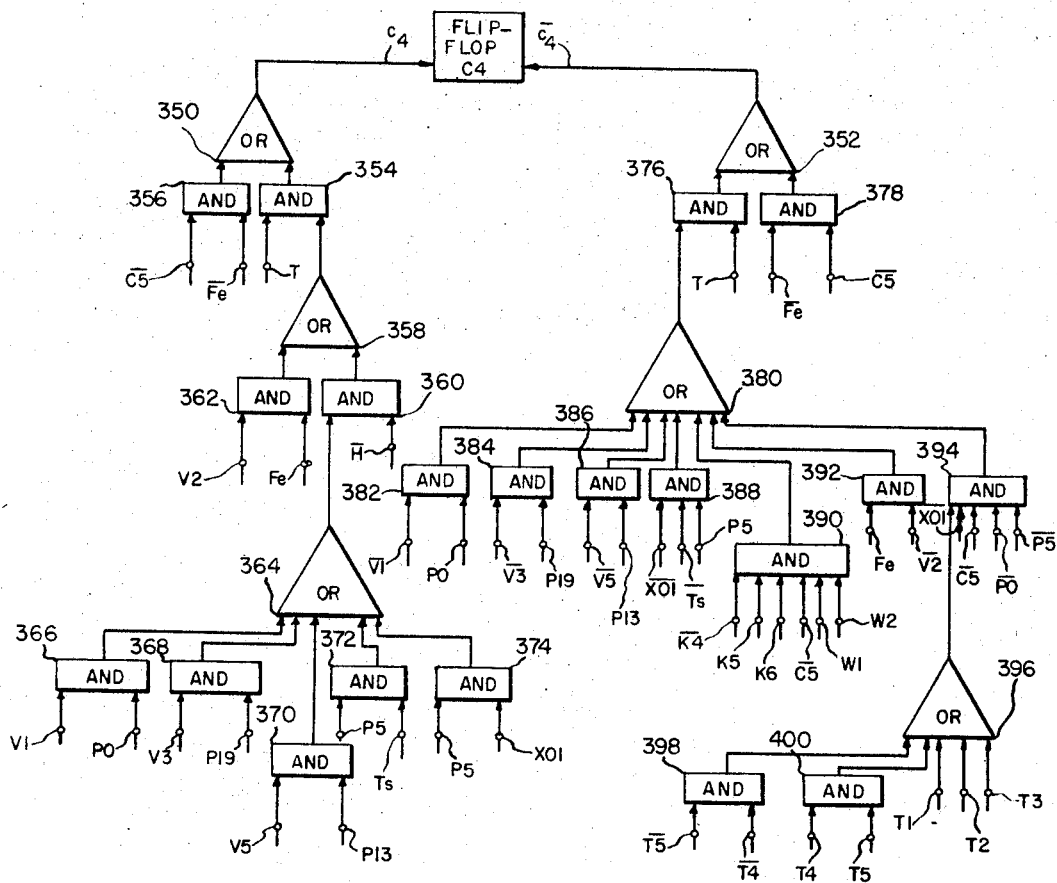
FIGURE 15 shows an add flip-flop for a one-increment adder-subtracter circuit used in the input system of the embodiment to be described.

The logic associated with add flip-flop C4 for the one-increment adder-subtracter is set out in FIGURE 15. This logic includes an "or" gate 350 connected to the true input terminal $c_4$ of the flip-flop (C4), and it includes an "or" gate 352 connected to the false input terminal $\overline{c_4}$ of that flip-flop. A pair of "and" gates 354 and 356 is connected to the "or" gate 350. An "or" gate 358 is connected to the "and" gate 354, and the term T is introduced to that "and" gate.

The terms $\overline{Fe}$ and $\overline{C5}$ are introduced to the "and" gate 356. A pair of "and" gates 360 and 362 is connected to the "or" gate 358. The term $\overline{H}$ is introduced to the "and" gate 360, and the terms Fe and V2 are introduced to the "and" gate 362. An "or" gate 364 is connected to the "and" gate 360, and a plurality of "and" gates 366, 368, 370, 372 and 374 is connected to the "or" gate 364. The terms V1 and P0 are introduced to the "and" gate 366, the terms V3 and P19 are introduced to the "and" gate 368, the terms V5 and P12 are introduced to the "and" gate 370, the terms P5 and TS are introduced to the "and" gate 372, and the terms P5 and X01 are introduced to the "and" gate 374.

A pair of "and" gates 376 and 378 is connected to the "or" gate 352. An "or" gate 380 is connected to the "and" gate 376, and the term T is introduced to that "and" gate. The terms $\overline{Fe}$ and $\overline{C5}$ are introduced to the "and" gate 378.

A plurality of "and" gates 382, 384, 386, 388, 390, 392 and 394 is connected to the "or" gate 380. The terms $\overline{V1}$ and P0 are introduced to the "and" gate 382, the terms $\overline{V3}$ and P19 are introduced to the "and" gate 384, and the terms $\overline{V5}$ and P13 are introduced to the "and" gate 386. The terms $\overline{X01} \cdot T_S$ and P5 are introduced to the "and" gate 388. The terms $\overline{K4}$, K5, K6, $\overline{C5}$, W1 and W2 are introduced to the "and" gate 390. The terms Fe and $\overline{V2}$ are introduced to the "and" gate 392. The terms $\overline{C5}$, $\overline{P0}$, $\overline{X01}$ and $\overline{P5}$ are introduced to the "and" gate 394. An "or" gate 396 is connected to the "and" gate 394, and a pair of "and" gates 398 and 400 is connected to that "or" gate. The terms T1, T2 and T3 are introduced to the "or" gate 396. The terms $\overline{T4}$ and $\overline{T5}$ are introduced to the "and" gate 398, and the terms T4 and T5 are introduced to the "and" gate 400.

Figure 16:
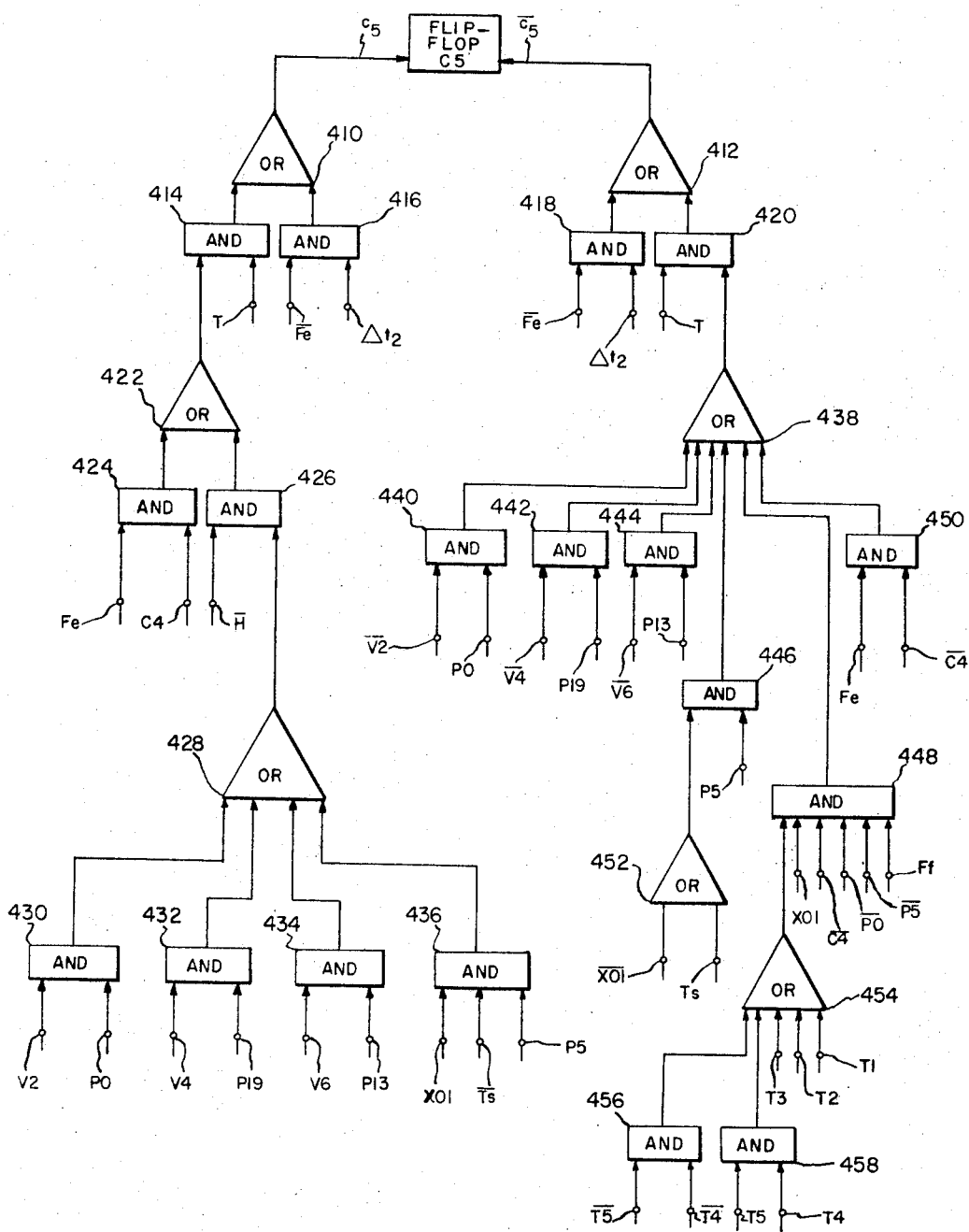
FIGURE 16 shows a subtract flip-flop for use with the one-increment adder-subtracter circuit.

The logic associated with the add flip-flop C4 may be represented by the equations:

$c_4 = \{[V1 \cdot P0 + (V3 \cdot \overline{T5} \cdot T4 + V5 \cdot T5 \cdot \overline{T4})\overline{T3} \cdot \overline{T2} \cdot \overline{T1}$
$\qquad + \overline{T5} \cdot T4 \cdot T2 \cdot \overline{T1}(T_S + X01)]\overline{H} + Fe \cdot V2\}T + \overline{Fe} \cdot \overline{C5}$
$\overline{c_4} = [\overline{V1} \cdot P0 + (\overline{V3} \cdot \overline{T5} \cdot T4 + \overline{V5} \cdot T5 \cdot \overline{T4})\overline{T3} \cdot \overline{T2} \cdot \overline{T1}$
$\qquad + \overline{T5} \cdot \overline{X01} \cdot T5 \cdot T4 \cdot T2 \cdot \overline{T1} + \overline{K4} \cdot K5 \cdot K6 \cdot \overline{C5} \cdot W1 \cdot W2$
$\qquad + \overline{C5} \cdot \overline{P0} \cdot \overline{P5} \cdot \overline{X01}(T3 + T2 + T1 + \overline{T5} \cdot \overline{T4}$
$\qquad + T5 \cdot T4) + Fe \cdot \overline{V2}]T + \overline{Fe} \cdot \overline{C5}$ The subtract flip-flop C5 for the one increment adder-subtracter network is shown, with its associated logic, in FIGURE 16. An "or" gate 410 is connected to the true input terminal $c_5$ of that flip-flop, and an "or" gate 412 is connected to the false input terminal $\overline{c_5}$ of the flip-flop. A pair of "and" gates 414 and 416 is connected to the "or" gate 410, and a pair of "and" gates 418 and 420 is connected to the "or" gate 412.

The term T is introduced to the "and" gate 414, and the terms $\overline{Fe}$ and $\Delta t_2$ are introduced to the "and" gate 416. An "or" gate 422 is connected to the "and" gate 414 and a pair of "and" gates 424 and 426 are connected to the "or" gate. The terms Fe and C4 are introduced to the "and" gate 424. The term $\overline{H}$ is introduced to the "and" gate 426, and an "or" gate 428 is connected to the "and" gate. A plurality of "and" gates 430, 432, 434 and 436 is connected to the "or" gate 428. The terms V2 and P0 are introduced to the "and" gate 430. The terms V4 and P19 are introduced to the "and" gate 432. The terms V6 and P13 are introduced to the "and" gate 434. The terms X01, $\overline{T_S}$ and P5 are introduced to the "and" gate 436.

The terms $\overline{Fe}$ and $\Delta t_2$ are introduced to the "and" gate 418, and the term T is introduced to the "and" gate 420. An "or" gate 438 is connected to the "and" gate 420, and a plurality of "and" gates 440, 442, 444, 446, 448 and 450 is connected to the "or" gate 438.

The terms $\overline{V2}$ and P0 are introduced to the "and" gate 440, the terms $\overline{V4}$ and P19 are introduced to the "and" gate 442, and the terms $\overline{V6}$ and P13 are introduced to the "and" gate 444. The term P5 is introduced to the "and" gate 446, and an "or" gate 452 is also connected to that "and" gate. The terms $\overline{X01}$ and Ts are introduced to the "or" gate 452. The terms X01, $\overline{C4}$, $\overline{P0}$, $\overline{P5}$ and Ff are introduced to the "and" gate 448. The terms Fe and $\overline{C4}$ are introduced to the "and" gate 450.

An "or" gate 454 is connected to the "and" gate 448, and a pair of "and" gates 456 and 458 are connected to the "or" gate 454. The terms T3, T2 and T1 are introduced to the "or" gate 454. The terms $\overline{T4}$ and $\overline{T5}$ are introduced to the "and" gate 456, and the terms T4 and T5 are introduced to the "and" gate 458.

The counter logic for the flip-flop C5 is through the gates 416 and 410 and through the gates 418 and 412 in FIGURE 16. Then, each time one of the flip-flops of FIGURE 13 passes from a true to a false state, it triggers the flip-flop on its left hand side. For example, when the flip-flop C5 is triggered from a true to a false state, the gates 356 and 350 or 378 and 352 cause the flip-flop C4 to be triggered to a state opposite to its previous state. This operation also applies for the other flip-flops in the shift register and counter of FIGURE 13. As mentioned above, this counting continues until all the flip-flops in the register are set to zero to represent a count down to zero of the number originally in the register. Then, appropriate circuitry is activated to cause the computer again to be energized.

The system described above, therefore, enables the general purpose computer to determine a time interval during which it is to be de-energized. Then, the register and counter of FIGURE 13 counts out that interval, so that the computer may again be energized at the termination of the interval.

The logic of FIGURE 15 illustrates the manner in which the flip-flop C4 is set true at appropriate intervals in response to information from the positive increment flip-flops V1, V3, V4 and from the time standard flip-flop $T_S$. As shown, this flip-flop is set true just before P24 time for X-axis velocity increments, just before P18 bit time for Y-axis velocity increments, and just before P12 bit time for Z-axis velocity increments. Also, the flip-flop C4 is set true just before P4 bit time for time standard increments $\Delta t_1$ from the flip-flop $T_S$. After receiving the appropriate information, the flip-flop C4 is set false at the proper times by the logic control system coupled to its false input terminal. In the same manner, the subtract flip-flop C5 of FIGURE 16 is set true at the appropriate times by information received from the negative velocity increment flip-flops V2, V4 and V6. Likewise, after receiving the appropriate information, the flip-flop C5 is set false by the logic control system coupled to its false input terminal.

The logic associated with the subtract flip-flop C5 may be represented by the equations:

$$c_5 = \{[V2.P0 + (V4.\overline{T5}.T4 + V6.T5.\overline{T4})\overline{T3}.\overline{T2}.\overline{T1} + XO1.T_S.T5.T4.T2.T1]H + Fe.C4\}T + \overline{Fe}\,t_2$$

$$\overline{c}_5 = [\overline{V2}.P0 + (\overline{V4}.\overline{T5}.T4 + \overline{V6}.T5.\overline{T4})\overline{T3}.\overline{T2}.\overline{T1} + T5.T4.T2.\overline{T1}(\overline{XO1} + T_S) + XO1.\overline{C4}.\overline{P0}.\overline{P5}(T3 + T2 + T1 + \overline{T5}.\overline{T4} + T5.Tr)Ff + Fe.\overline{C4}]T + \overline{Fe}.\Delta t_2$$

The asynchronous pulses $+\sigma\dot{x}$ each sets the flip-flop V1 in response to positive velocity increments along the X axis. In like manner, the asynchronous pulses $-\sigma\dot{x}$ corresponding to the negative velocity increments along the X axis each sets the flip-flop V2. In like manner, the asynchronous pulses $+\sigma\dot{y}$ each sets the flip-flop V3, and the asynchronous pulses $-\sigma\dot{y}$ each sets the flip-flop V4, for negative velocity increments along the Y axis. Likewise, the asynchronous pulses $+\sigma\dot{z}$ from the inertial platform each sets the flip-flop V5 for positive velocity increments along the Z axis, and the asynchronous pulses $-\sigma\dot{z}$ each sets the flip-flop V6 for negative velocity increments along the Z axis.

In each instance, the flip-flops V1–V6 must be reset in the interval between succeeding ones of the different series of asynchronous velocity increment pulses from the inertial platform which are respectively introduced to these flip-flops. This is so that any time an asynchronous velocity increment pulse is produced by the inertial platform on any one of the different lines extending to the incremental flip-flops V1–V6, the corresponding one of the incremental flip-flops is in its reset state and in a condition to be set by such a pulse.

The flip-flops C4 and C5 represent the add and subtract flip-flops respectively of the one-increment adder-subtracter network AA. The flip-flop C4 is set for positive velocity increments along any of the three axes, and the flip-flop C5 is set for negative velocity increments along those axes. The flip-flops C4 and C5, in turn, control the one-increment adder-subtracter network AA to add or subtract these velocity increments to or from the velocity increments already stored in the fast accumulator register $X_0$ during the input operation of FIGURE 4A.

The positive increment flip-flops V1, V3 and V5 feed their contents to the flip-flop C4 at the proper intervals, and the negative increment flip-flops V2, V4 and V6 feed their contents to the flip-flop C5 at the appropriate intervals. Whenever the flip-flop V1 sets the flip-flop C4, the flip-flop V1 is set false in the following P24 bit time. Likewise, whenever the flip-flop V2 sets the flip-flop C5, the flip-flop V2 is returned to its reset state at the following P24 bit time.

In like manner, whenever the flip-flop V3 sets the flip-flop C4, the flip-flop V3 is returned to its reset state at the following P18 bit time; and whenever the flip-flop V4 sets the flip-flop C5 true, the flip-flop V4 is reset at the following P18 bit time. In like manner, whenever the flip-flop V5 sets the flip-flop C4, the flip-flop V5 is returned to its reset state at the following P12 bit time; and whenever the flip-flop V6 sets the flip-flop C5, the flip-flop V6 is reset at the following P12 bit time.

The action described above enables any one of the flip-flops V1–V6 to be set by a corresponding one of the asynchronous pulses derived on different lines from the inertial platform, and then to transfer its contents to the coresponding flip-flops C4 or C5, and then to be reset before a succeeding asynchronous pulse can occur on the same line.

The logic associated with the write amplifier 32 may be represented by the logic equations.

Figure 17:
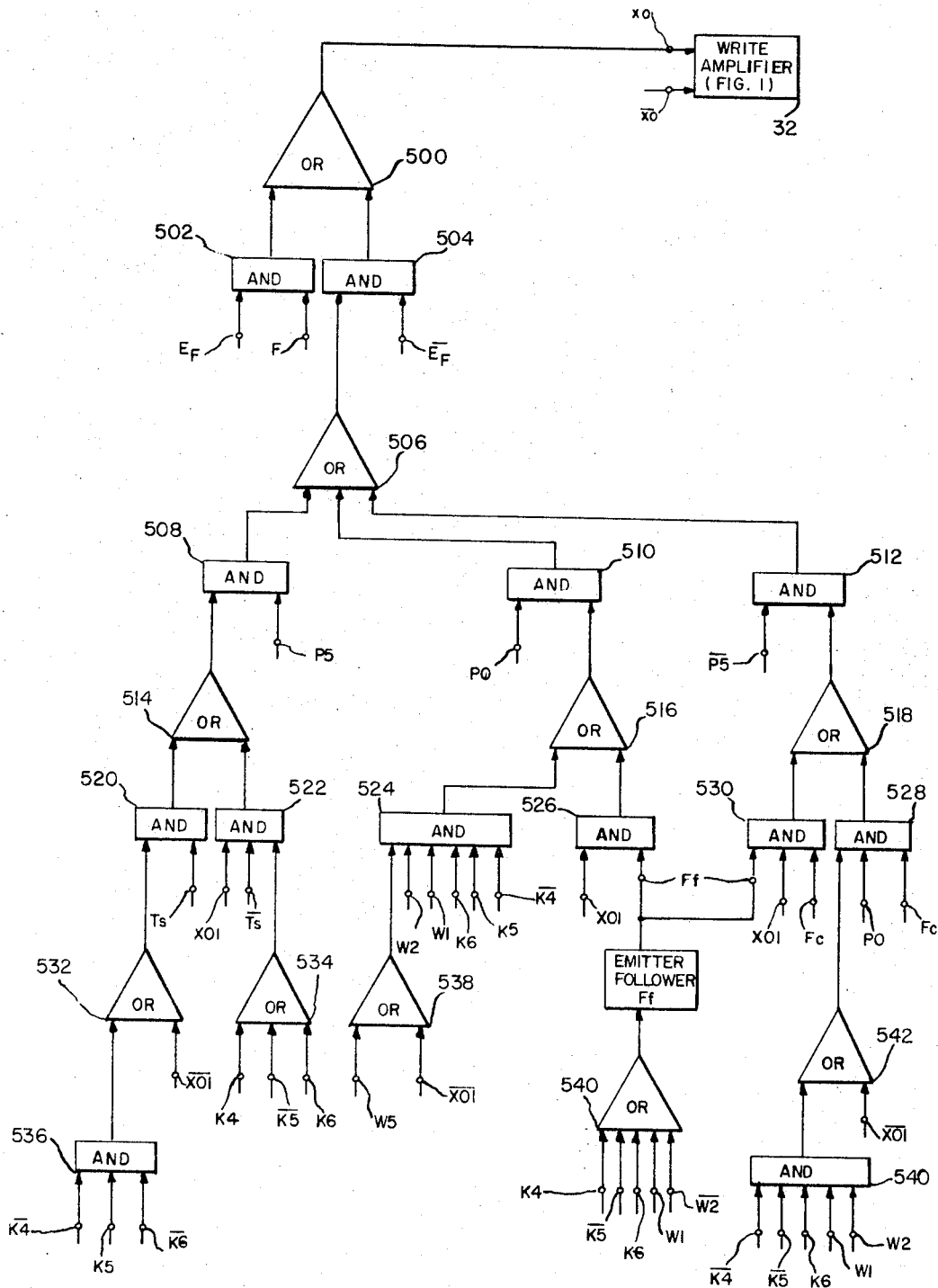
FIGURE 17 shows the true inputs for one of a plurality of write amplifiers shown in FIGURE 2.

The $x_0$ input to the write amplifier 32 is shown in FIGURE 17. An "or" gate 500 supplies that input to the write amplifier. A pair of "and" gates 502 and 504 are connected to the "or" gate 500. The terms $E_F$ and F are applied to the "and" gate 502. An "or" gate 506 is connected to the "and" gate 504, and the term $E_F$ is introduced to that "and" gate. A plurality of "and" gates 508, 510 and 512 are connected to the "or" gate 506. The term P5 is introduced to the "and" gate 508, the term P0 is introduced to the "and" gate 510, and the term $\overline{P5}$ is introduced to the "and" gate 512. A plurality of "or" gates 514, 516 and 518 is connected to the "and" gates 508, 510 and 512, respectively. A pair of "and" gates 520 and 522 is connected to the "or" gate 514. A pair of "and" gates 524 and 526 is connected to the "or" gate 516. A pair of "and" gates 528 and 530 is connected to the "or" gate 518.

An "or" gate 532 is connected to the "and" gate 520, and an "or" gate 534 is connected to the "and" gate 522. The time standard term $T_S$ is introduced to the "and" gate 520, and the terms XO1 and $T_S$ are introduced to the "and" gate 522. The terms K4, $\overline{K5}$ and K6 are introduced to the "or" gate 534. The terms $\overline{K4}$, K5 and $\overline{K6}$ are introduced to an "and" gate 536. That "and" gate is connected to the "or" gate 532, and the term $\overline{XO1}$ is introduced to the "or" gate.

The terms W5 and $\overline{XO1}$ are introduced to an "or" gate 538. That "or" gate is connected to the "and" gate 524. The terms W1, W2, $\overline{K4}$, K5 and K6 are introduced to the "and" gate 524. The terms K4, $\overline{K5}$, K6, $\overline{W1}$ and $\overline{W2}$ are introduced to an "or" gate 540. The "or" gate 540 is connected to an emitter follower Ff. The emitter follower Ff introduces the term Ff to the "and" gate 526 and to the "and" gate 530. The term XO1 is also introduced to the "and" gate 526.

The terms $\overline{K4}$, $\overline{K5}$, K6, W1 and W2 are introduced to an "and" gate 540. The "and" gate 540 is connected to an "or" gate 542, and the term $\overline{XO1}$ is also introduced to that "or" gate. The "or" gate 542 is connected to the "and" gate 528. The terms $\overline{P0}$ and Fc are introduced to the "and" gate 528. The terms XO1 and $\overline{Fc}$ are introduced to the "and" gate 530.

Figure 18:
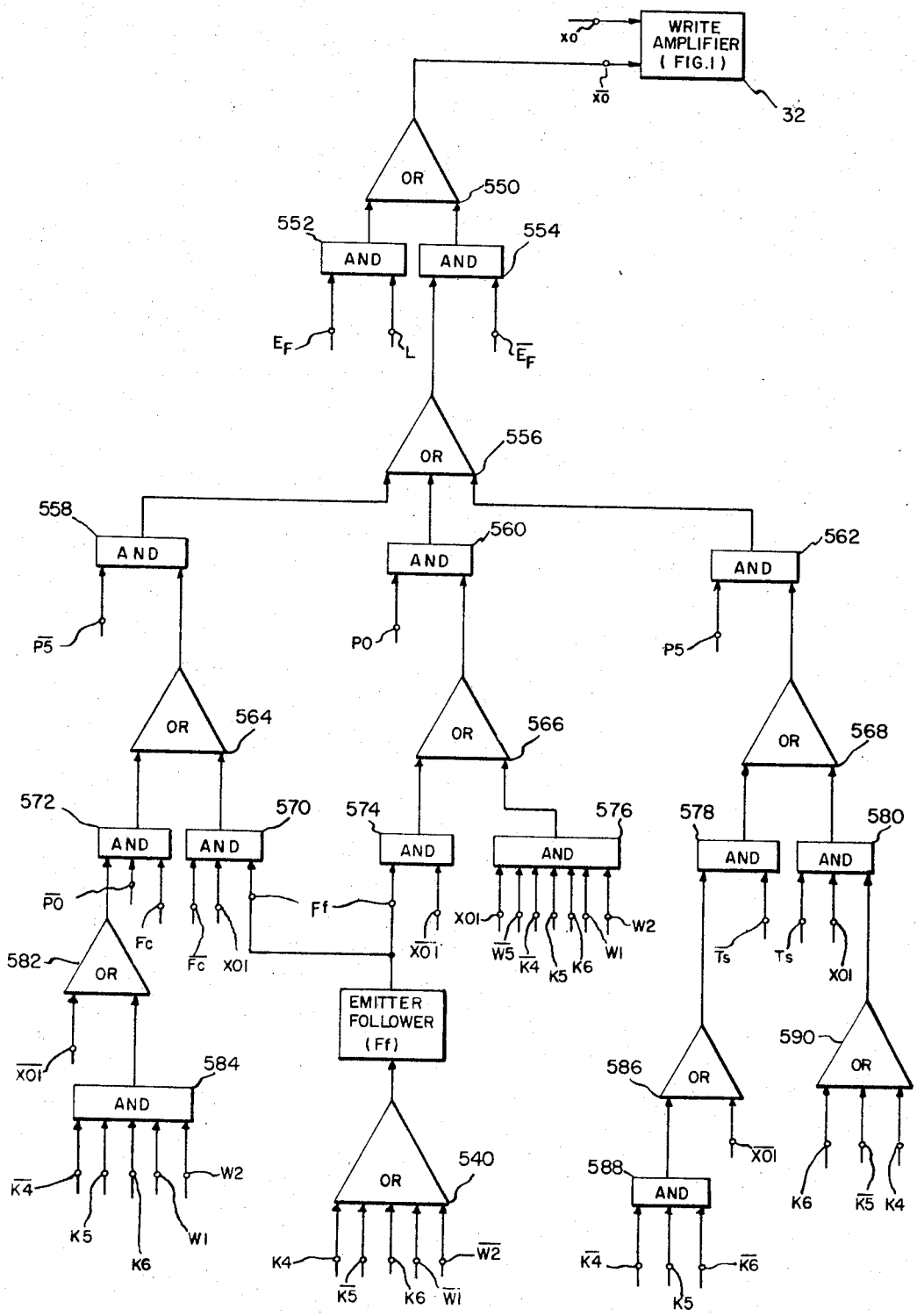
FIGURE 18 shows the false inputs for the write amplifier of FIGURE 17.

The logic circuitry for introducing the term $\bar{x}_0$ to the write amplifier 32 of FIGURE 1 is illustrated in FIGURE 18. The circuitry includes an "or" gate 550 which introduces the term $\bar{x}_0$ to the write amplifier 32. A pair of "and" gates 552 and 554 is connected to the "or" gate. The terms Ef and L are applied to the "and" gate 552. An "or" gate 556 is connected to the "and" gate 554, and the term $\overline{Ef}$ is introduced to that "and" gate. A plurality of "and" gates 558, 560 and 562 is connected to the "or" gate 556. The term P5 is introduced to the "and" gate 558. An "or" gate 564 is also connected to the "and" gate 558. The term P0 is introduced to the "and" gate 560, and an "or" gate 566 is connected to that "and" gate. The term P5 is introduced to the "and" gate 562, and an "or" gate 568 is connected to that "and" gate. A pair of "and" gates 570 and 572 is connected to the "or" gate 564. A pair of "and" gates 574 and 576 is connected to the "or" gate 566. A pair of "and" gates 578 and 580 is connected to the "or" gate 568.

The terms $\overline{Fc}$, XO1 and Ef are introduced to the "and" gate 570. As explained in conjunction with FIGURE 17, the term Ff is derived from the emitter follower Ff. The terms Fc and $\overline{P_0}$ are introduced to the "and" gate 572, and an "or" gate 582 is connected to that "and" gate. The term $\overline{XO1}$ is applied to the "or" gate 582, and an "and" gate 582 is also connected to the "or" gate 582. The terms $\overline{K4}$, K5, K6 W1 and W2 are introduced to the "and" gate 584.

The terms $\overline{XO1}$ and Ff are applied to the "and" gate 574. The terms XO1, $\overline{W5}$, $\overline{K4}$, K5, K6, W1 and W2 are introduced to the "and" gate 576. The term $T_S$ is introduced to the "and" gate 578, and an "or" gate 586 is also connected to that "and" gate. The term $\overline{XO1}$ is introduced to the "or" gate 586, and an "and" gate 588 is connected to the "or" gate. The terms $\overline{K4}$, K5 and $\overline{K6}$ are introduced to the "and" gate 588.

The terms K4, $\overline{K5}$ and K6 are introduced to the "or" gate 590, and that "or" gate is connected to the "and" gate 580. The terms $T_S$ and XO1 are both introduced to the "and" gate 580.

$$x_0 = \overline{Ef}\{\overline{P5}[\overline{P0}.Fe(\overline{K4}.K5.K6.W1.W2 + \overline{XO1}$$
$$+ XO1.\overline{Fc}.Ff + P0[W5 + \overline{XO1}]\overline{K4}.K5.K6.W1.W2$$
$$+ XO1.Ff] + P5(\overline{K4}.K5.\overline{K6} + \overline{XO1})T_S XO1.T_S$$
$$(K4+K5+K6)]\}Ef.F$$
$$Ef = K4 + \overline{K5} + K6 + \overline{W1} + \overline{W2}$$
$$\bar{x}_0 = \{\overline{Ef}.\overline{P5}.\overline{P0}[Fc.XO1.Ff + \overline{Fc}(\overline{XO1} + \overline{K4}.K5.K6.$$
$$W1.W2) + P0[\overline{XO1}.Ff + XO1.\overline{W5}.\overline{K4}.K5.K6.\overline{W1}.W2]$$
$$+ P5[\overline{XO1} + \overline{K4}.K5.\overline{K6}]T_S T_S.XO1$$
$$(K4+K5+K6]\} + Ef.L$$

The above logic serves to add the different positive or negative velocity increments along the X, Y and Z axes into the one word register Xo and in the position shown in FIGURE 3.

It will be remembered that time increments $T_1$ are also accumulated in the Xo register. These time increments are always positive, and are introduced through an appropriate control of the add flip-flop C4 by the time standard flip-flop $T_S$. The time standard flip-flop responds to the time increment pulses $\sigma t_1$ which sets the flip-flop $T_S$. The flip-flop $T_S$ then sets the flip-flop C4 at the appropriate interval, and it is returned to its reset state at the following P4 bit time.

The logic associated with the time standard flip-flop $T_S$ may be represented by the equations:

$$t_S = \sigma t_1.\overline{H}Fe.V6T + \overline{Fe}.\overline{V3}$$
$$\overline{t_S} = (T5.T4.T3.T2.T1.\overline{C5}.C4 + Fe.\overline{V6})T + \overline{Fe}.V3$$

It is evident, therefore, that whenever the flip-flop H is false, so as to render the term $\overline{H}$ true, the flip-flops V1–V6 and the flip-flop $T_S$ are controlled by asynchronous velocity increment pulses from the inertial platform, and by time standard pulses $\sigma t_1$ respectively.

In response to the special instruction from the general purpose computer, the flip-flop H is set true. The purpose of this is to permit a number corresponding to a predetermined time interval to be shifted into the register of FIGURE 6. Then, as mentioned above, the computer is de-energized and an auxiliary control causes the register of FIGURE 6 to function as a counter to count the number in it down to zero. When that occurs, the computer may again be energized. When the term $\overline{H}$ is no longer true, the flip-flops V1–V6 and the flip-flop $T_S$ are no longer under the control of the velocity increment pulses from the inertial platform or of the time standard pulses $\sigma t_1$. When this occurs, and when the logic term Fe is true, these flip-flops, together with the flip-flop $T_S$, and the flip-flops C4 and C5, form the register of FIGURE 6.

During the mode of operation when the term $\overline{H}$ is false, and the term Fe is true, the flip-flop V5 copies the contents of the accumulator register A of FIGURE 2. As each bit $A_0$, $\overline{A_0}$ is copied from the accumulator register into the flip-flop V5, it is shifted through the register in the sequence shown in FIGURE 6. When the complete number is shifted from the accumulator register A of FIGURE 2 into the register of FIGURE 6, the term Fe goes false and the term $\overline{Fe}$ goes true. Then, the control of the flip-flops of FIGURE 6 is such that the number shifted into the flip-flop is counted down to zero.

For the latter purpose, the flip-flop C5 represents the least significant bit, and it responds to the time pulses $\Delta t_2$ from the "Incremag," as mentioned above. These time pulses, as mentioned, occur at the rate of one for every hundred seconds, for example.

As mentioned above, when the counter logic of the flip-flops of FIGURE 6 is activated, the counter counts down, one step at a time, until all the flip-flops are set to zero. Then, appropriate circuitry is activated to cause the main computer 12 again to be energized. The system described, therefore, enables the general purpose computer 12 to determine a time interval during which it and the auxiliary computer 14 are to be de-energized. Then, the register and counter of FIGURE 6 counts out that interval, so that the computers may again be energized at the termination of the interval.

As mentioned above, the first operational phase $\phi 1$ performed by the auxiliary computer of the invention serves to cause the Yo register to accept from the Xo register the summations $\Delta \dot{X}$, $\Delta \dot{Y}$, $\Delta \dot{Z}$ and $\Delta T_1$ of the random positive and negative velocity increment pulse input and positive time standard pulse inputs, and to add these inputs to the previously accumulated quantities $\dot{X}$, $\dot{Y}$, $\dot{Z}$ and $T_1$ contained at different word positions in the Yo register. This function $\phi 1$ is carried out, as mentioned, by feeding the contents of the flip-flop Xo2 and of the flip-flop Yo2 into the two input adder BB as shown in FIGURE 4B.

The velocity increments $\Delta \dot{X}$, $\Delta \dot{Y}$, $\Delta \dot{Z}$, from the Xo register are accumulated in the Yo register, so that the numbers stored in the Yo register represent the velocity $\dot{X}$, $\dot{Y}$ and $\dot{Z}$. These numbers are stored at different word positions in the Yo register, as noted above.

During the $\phi 1$ operational phase, the numbers representing the velocity increments $\Delta \dot{X}$, $\Delta \dot{Y}$ and $\Delta \dot{Z}$ are transferred from the Xo register to the Yo register and are added to the numbers already in the Yo register. In like manner, the number representing the the time increment $\Delta T_1$ in the Xo register is transferred during the $\phi 1$ operational phase to the Yo register and added to the number in the Yo register representing real time $T_1$.

As noted above, the read heads A, B, C and D of FIGURE 2 are controlled to feed the signals to the read amplifier 36 at appropriate times, so that during the $\phi 1$ operational phase, the $\Delta \dot{X}$ information from the Xo register may be added to the lower bit positions of the $\dot{X}$ information in the Yo register; and so that the $\Delta \dot{Y}$ information from the Xo register may be added to the lower bit positions of the $\dot{Y}$ information in the Yo register; and so that the $\Delta \dot{Z}$ information from the Xo register may be added to the lower bit positions of the $\dot{Z}$ information in the Yo register. In addition, the assembly is such that the $\Delta T_1$, information from the Xo register may be added to the lower bit positions of the $T_1$ information in the Yo register.

The selective control of the read heads A, B, C and D is effected by the flip-flops W1 and W2, as mentioned above, the $\phi 1$ operational phase is made to occur at different word times, as described, so as to provide for the respective $\Delta \dot{X}$, $\Delta \dot{Y}$, $\Delta \dot{Z}$ and $\Delta T_1$ transfers of FIGURE 4B, at a predetermined number of times, such as four, for each half drum revolution.

Figure 19:
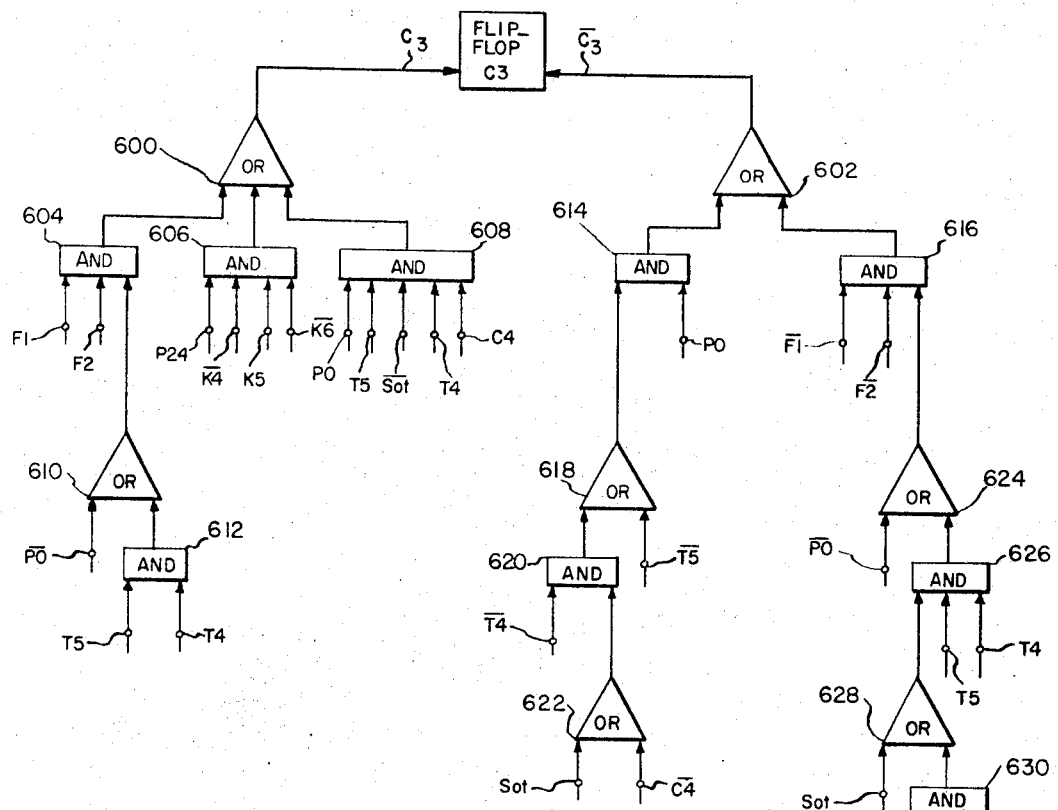
FIGURE 19 shows the logic associated with a carry flip-flop which is used in a two-input adder included in the embodiment to be described.

The carry flip-flop for the two-input adder BB for the register, Yo, is illustrated in FIGURE 19. As indicated previously, this flip-flop is designated C3. An "or" gate 600 is connected to the true input terminal $c_3$ of the flip-flop (C3), and an "or" gate 602 is connected to the false input terminal $\overline{c_3}$ of the flip-flop.

A plurality of "and" gates 604, 606 and 608 is connected to the "or" gate 600. The terms F1 and F2 are introduced to the "and" gate 604, and an "or" gate 610 is also connected to that "and" gate. The terms F1 and F2 are respectively derived from the emitter follower circuits of FIGURES 20 and 21. The term $\overline{P0}$ is introduced respectively to the "or" gate 610, and an "and" gate 612 is also connected to the "or" gate. The terms T4 and T5 are introduced to the "and" gate 612. The terms P24, $\overline{K4}$, K5 and $\overline{K6}$ are introduced to the "and" gate 606. The terms P0, T5, $\overline{Sot}$, $\overline{T4}$ and C4 are introduced to the "and" gate 608.

A pair of "and" gates 614 and 616 is connected to the "or" gate 602. The term P0 is introduced to the "and" gate 614, and an "or" gate 618 is connected to that "and" gate. An "and" gate 620 is connected to the "or" gate 618, and the term $\overline{T5}$ is introduced to the "or" gate. The term $\overline{T4}$ is introduced to the "and" gate 620, and an "or" gate 622 is connected to the "and" gate. The terms Sot and $\overline{C4}$ are applied to the "or" gate 622.

The terms $\overline{F1}$ and $\overline{F2}$ are introduced to the "and" gate 616. An "or" gate 624 is also connected to the "and" gate 616, and an "and" gate 626 is connected to the "or" gate. The terms $\overline{F1}$ and $\overline{F2}$ are also derived from the emitter follower circuits of FIGURES 20 and 21. The term $\overline{P0}$ is introduced to the "or" gate 624. An "or" gate 628 is connected to the "and" gate 626, and the terms T4 and T5 are introduced to that "and" gate. The term Sot is introduced to the "or" gate 628, and an "and" gate 630 is connected to that "or" gate. The terms $\overline{K4}$, K5 and K6 are introduced to the "and" gate 630.

Figure 20:
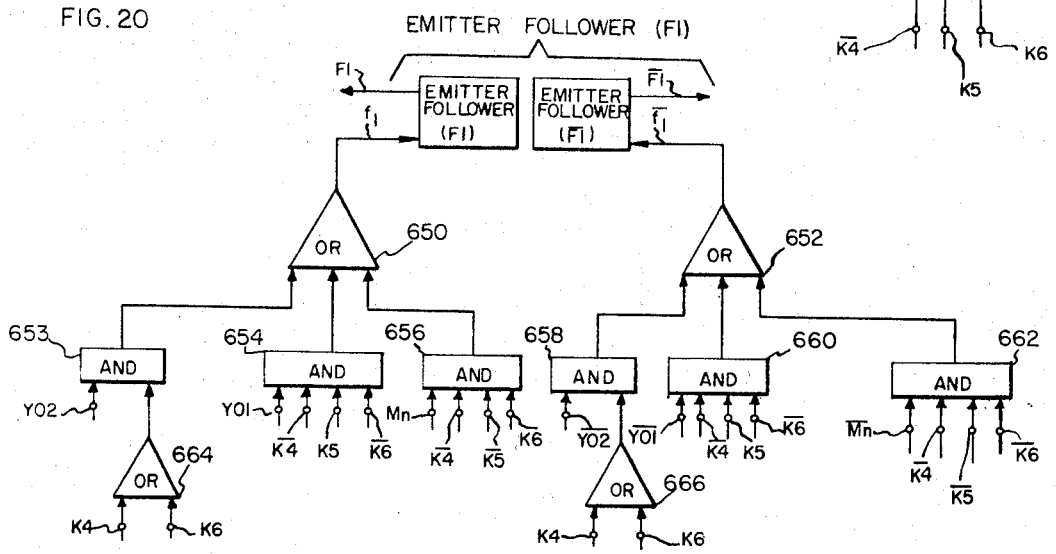
FIGURES 20 and 21 are further logic diagrams of certain ones of the logic terms associated with the flip-flop of FIGURE 19.

The term F1 introduced to the "and" gate 604 in FIGURE 19 may be derived from an emitter follower F1, illustrated in FIGURE 20, and the term $\overline{F1}$ introduced to the "and" gate 616 may be derived from an emitter follower $\overline{F1}$ in FIGURE 20. An "or" gate 650 is connected to the input terminal $f_1$ of the emitter follower F1, and an "or" gate 652 is connected to the false input terminal $\overline{f_1}$ of the emitter follower $\overline{F1}$.

A plurality of "and" gates 653, 654 and 656 is connected to the "or" gate 650. A plurality of "and" gates 658, 660, 662 is connected to the "or" gate 652. An "or" gate 664 is connected to the "and" gate 653, and an "or" gate 666 is connected to the "and" gate 658. The term YO2 is introduced to the "and" gate 653, and the terms K4 and K6 are introduced to the "or" gate 664. The terms YO1, $\overline{K4}$, K5, $\overline{K6}$ are introduced to the "and" gate 654. The terms Mn, $\overline{K4}$, $\overline{K5}$ and $\overline{K6}$ are introduced to the "and" gate 656. The term $\overline{YO2}$ is introduced to the "and" gate 658, and the terms K4 and K6 are introduced to the "or" gate 666. The terms $\overline{YO1}$, $\overline{K4}$, K5 and $\overline{K6}$ are introduced to the "and" gate 660. The terms $\overline{Mn}$, $\overline{K4}$, $\overline{K5}$ and $\overline{K6}$ are introduced to the "and" gate 662.

Figure 21:
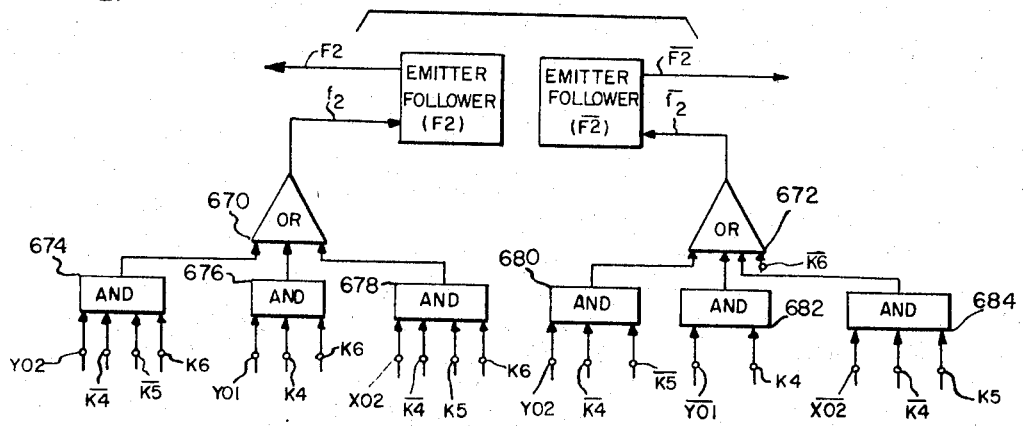

The terms F2 introduced to the "and" gate 604 in FIGURE 19 may be produced by an emitter follower F2, and the term $\overline{F2}$ introduced to the "and" gate 616 may be produced by an emitter follower $\overline{F2}$, both these emitter followers being shown in FIGURE 21. An "or" gate 670 is connected to the input terminal $f_2$ of the emitter follower F2, and an "or" gate 672 is connected to the input termnal of the emitter follower $\overline{F2}$.

A plurality of "and" gates 674, 676 and 678 is connected to the "or" gate 670. The terms YO2, $\overline{K4}$, $\overline{K5}$ and K6 are introduced to the "and" gate 674. The terms YO1, K4, K6 are introduced to "and" gate 676. The terms XO2, $\overline{K4}$, K5 and K6 are introduced to the "and" gate 678.

A plurality of "and" gates 680, 682 and 684 is connected to the "or" gate 672. The term $\overline{K6}$ also is introduced to the "or" gate 672. The terms $\overline{YO2}$, $\overline{K4}$ and $\overline{K5}$ are introduced to the "and" gate 680. The terms $\overline{YO1}$ and K4 are introduced to the "and" gate 682. The terms $\overline{XO2}$, $\overline{K4}$ and K5 are introduced to the "and" gate 684.

Figure 22:
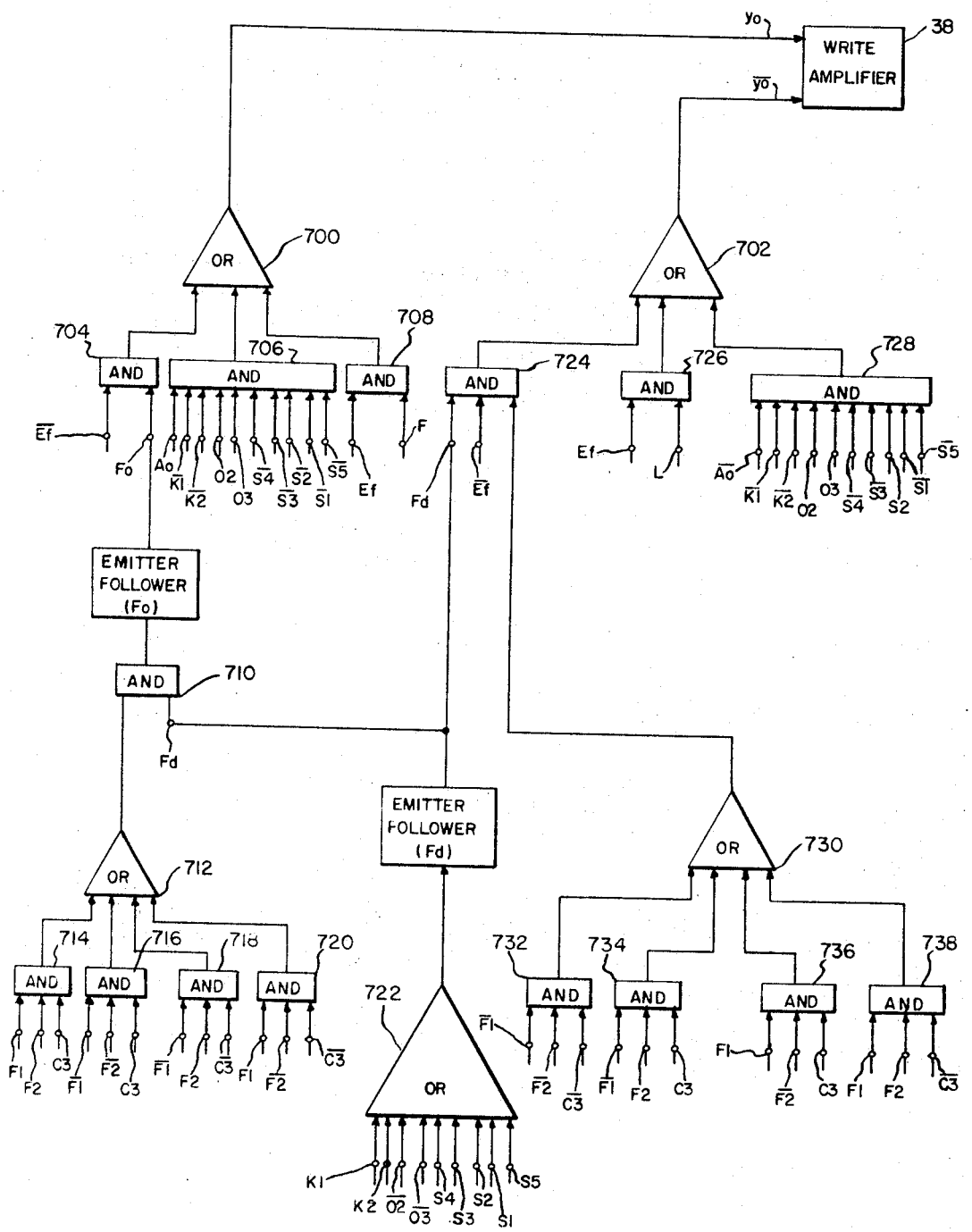
FIGURE 22 shows the true and false inputs to another write amplifier of the plurality shown in FIGURE 2.

The inputs to the write amplifier 38 of FIGURE 1 are provided by the logic control system of FIGURE 22. An "or" gate 700 introduced the input $y_0$ to the write amplifier 38, and an "or" gate 702 introduces the input $\overline{y_0}$ to the write amplifier. A plurality of "and" gates 704, 706 and 708 is connected to the "or" gate 700. The term $\overline{Ef}$ is introduced to the "and" gate 704, and an emitter follower Fo supplies the term FO to that "and" gate. The terms $A_0$, $\overline{K1}$, $\overline{K2}$, O2, O3, $\overline{S4}$, $\overline{S3}$, $\overline{S2}$, $\overline{S1}$ and $\overline{S5}$ are introduced to the "and" gate 706. The terms Ef and F are introduced to the "and" gate 708.

An "and" gate 710 is connected to the emitter follower Fo, and an "or" gate 712 is connected to the "and" gate. An emitter follower Fd also introduces the term Fd to the "and" gate 710. A plurality of "and" gates 714, 716, 718 and 720 are connected to the "or" gate 712. The terms F1, F2 and C3 are introduced to the "and" gate 714. The terms $\overline{F1}$, $\overline{F2}$ and C3 are introduced to the "and" gate 716. The terms F1, F2 and C3 are introduced to the "and" gate 718. The terms F1, $\overline{F2}$, $\overline{C3}$ are introduced to the "and" gate 720.

An "or" gate 722 is connected to the emitter follower Fd. The terms K, K2, $\overline{O2}$, $\overline{O3}$, S4, S3, S2, S1 and S5 are applied to the "or" gate 722. A plurality of "and" gates 724, 726 and 728 is connected to the "or" gate 702. The terms Fd and $\overline{Ef}$ are introduced to the "and" gate 724. An "or" gate 730 is also connected to the "and" gate 724. The terms Ef and L are applied to the "and" gate 726. The terms $\overline{A0}$, $\overline{K1}$, $\overline{K2}$, O3, $\overline{S4}$, $\overline{S3}$, $\overline{S2}$, $\overline{S1}$ and S5 are introduced to the "and" gate 728.

A plurality of "and" gates 732, 734, 736 and 738 is connected to the "or" gate 730. The terms $\overline{F1}$, $\overline{F2}$ and $\overline{C3}$ are introduced to the "and" gate 732. The terms $\overline{F1}$, F2 and C3 are introduced to the "and" gate 734. The terms F1, $\overline{F2}$ and C3 are introduced to the "and" gate 736. The terms F1, F2 and $\overline{C3}$ are introduced to the "and" gate 738.

Figure 23:
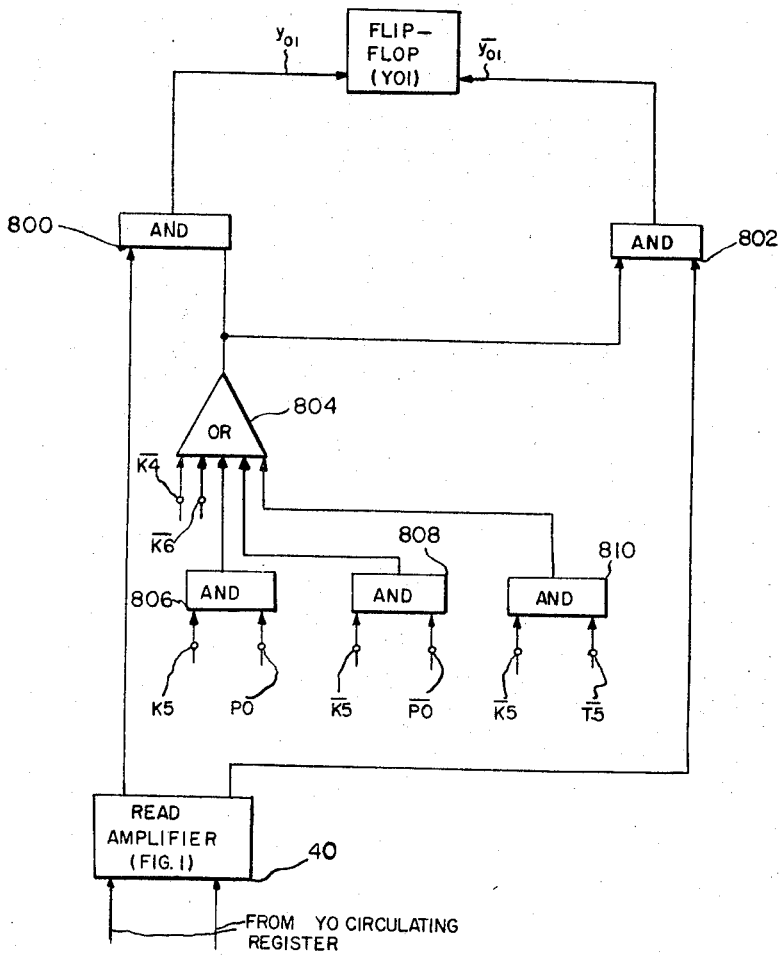
FIGURE 23 shows a logic control system associated with one of the read flip-flops of FIGURE 2.

The logic circuitry of FIGURE 23 includes an "and" gate 800 which is connected to the true input terminal YO1 of the flip-flop (YO1), and which includes an "and" gate 802 which is connected to the false input terminal of the flip-flop. An "or" gate 804 is connected to the "and" gates 800 and 802. The terms $\overline{K4}$ and $\overline{K6}$ are introduced to the "or" gate 804. A plurality of "and" gates 806, 808 and 810 is connected to the "or" gate 804. The terms K5 and P0 are introduced to the "and" gate 806, the terms $\overline{K5}$ and $\overline{P0}$ are introduced to the "and" gate 808, and the terms $\overline{K5}$ and $\overline{T5}$ are introduced to the "and" gate 810.

The logic associated with the two-input adder BB and its carry flip-flop C3 may be represented by the following logic equations:

$$c_3 = F1 \cdot F2(\overline{P0} + T5 \cdot T4) + P24 \cdot \overline{K4} \cdot K5 \cdot \overline{K6}$$
$$+ P0 \cdot T5 \cdot \overline{Sot} \cdot \overline{T4} \cdot C4$$
$$\overline{c_3} = P0[\overline{T4} \cdot (Sot + \overline{C4}) + \overline{T5}] + \overline{F1} \cdot \overline{F2}$$
$$[(Sot + \overline{K4} \cdot K5 \cdot K6) T5 \cdot T4 + \overline{P0})]$$
$$f_1 = Yo2(K4 + K6) + Yo1 \cdot \overline{K4} \cdot K5 \cdot \overline{K6} + M_n \cdot \overline{K4} \cdot \overline{K5} \cdot \overline{K6}$$
$$\overline{f_1} = \overline{Yo2}(K4 + K6) + \overline{Yo1} \cdot \overline{K4} \cdot K5 \cdot \overline{K6} + \overline{M}_n \cdot \overline{K4} \cdot \overline{K5} \cdot \overline{K6}$$
$$f_2 = Yo2 \cdot \overline{K4} \cdot \overline{K5} \cdot K6 + Yo1 \cdot K4 \cdot K6 + Xo2 \cdot \overline{K4} \cdot K5 \cdot K6$$
$$\overline{f_2} = \overline{Yo2} \cdot \overline{K4} \cdot \overline{K5} + \overline{Yo1} \cdot K4 + \overline{Xo2} \cdot \overline{K4} \cdot K5 + \overline{K6}$$
$$y_0 = \overline{Ef} \cdot Fo + A_0 \cdot \overline{K1} \cdot \overline{K2} \cdot O2 \cdot O3 \cdot \overline{S4} \cdot \overline{S3} \cdot \overline{S2} \cdot \overline{S1} \cdot \overline{S5} + Ef \cdot F$$
$$f_0 = (F1 \cdot F2 \cdot C3 + \overline{F1} \cdot \overline{F2} \cdot C3 + \overline{F1} \cdot F2 \cdot \overline{C3} + F1 \cdot \overline{F2} \cdot \overline{C3})$$
$$f_d = K1 + K2 + O2 + O3 + S4 + S3 + S2 + S1 + S5$$
$$\overline{y_0} = Fd(\overline{F1} \cdot \overline{F2} \cdot \overline{C3} + \overline{F1} \cdot F2 \cdot C3$$
$$+ F1 \cdot \overline{F2} \cdot C3 + F1 \cdot F2 \cdot \overline{C3})\overline{Ef}$$
$$+ \overline{Ao} \cdot \overline{K1} \cdot \overline{K2} \cdot O2 \cdot O3 \cdot \overline{S4} \cdot \overline{S3} \cdot \overline{S2} \cdot \overline{S1} \cdot \overline{S5} + Ef \cdot L$$

Provisions are made to permit storage in the Yo register from the general purpose computer 12 of FIGURE 1. For example, when a particular term is true, the contents of the accumulator A of the main computer (FIGURE 2) are read into the write amplifier 38 of the Yo register.

As described above, any one of the functions $\dot{X}$, $\dot{Y}$ or $\dot{Z}$ in the Yo register may be integrated as a function of real time so as to provide corresponding distance terms X, Y or Z, and these distance terms are also stored at different word positions in the Yo register. The integration of the function $\dot{X}$, $\dot{Y}$ or $\dot{Z}$ as a function of real time is carried out during the $\phi2$ operational phase of FIGURE 4C, and as mentioned above. The aforementioned integration is under the control of the $\Delta t_{200}$ bits stored in the P0 bit position in the Xo register, as shown in FIGURE 2.

The $\phi2$ operational phase may also be used to integrate a function placed in the Yo register from the general purpose computer 12, this latter function being stored in the Yo register in a manner described above. The $\phi2$ operational phase integrations are programmed to occur at the times the corresponding ones of the functions $\dot{X}$, $\dot{Y}$, $\dot{Z}$, etc. to be integrated are being read into the read amplifier 40 of the $Yo_1$ flip-flop.

The $\phi2$ operational phase integration of FIGURE 4C proceeds on the basis of real time under the control of the $\Delta t_{200}$ bits of FIGURE 3, as described above. The $\Delta t_{200}$ bits permits the system to enter the $\phi2$ operational phase so as to perform an integration only when such a bit appears at the P0 bit position in the Xo register. Otherwise, the system is caused to enter the recirculate operational phase $\phi6$, described above.

Therefore, as the drum 10 of FIGURE 2 rotates, the auxiliary computer may be programmed to enter the $\phi2$ operational phase after each half revolution of the memory drum of FIGURE 1. However, the $\Delta t_{200}$ bits are entered into the Xo register under a real time standard control, as described, and for certain half revolutions of the drum the corresponding $\Delta t_{200}$ bit may be deleted. When that occurs, the system is not permitted to enter the $\phi2$ operational phase, and the corresponding integration is omitted. In this manner, the particular function being integrated by any particular $\phi2$ operational phase operation is integrated on the basis of real time, as is desired.

Each time a $\Delta t_{200}$ bit permits a $\phi2$ operational phase to be carried out, the contents of the flip-flop Yo2 and the flip-flop Yo1 of FIGURE 2 are read into the adder logic BB of FIGURE 4C, and the sum of the two quantities is read into the write amplifier 38. As mentioned, the phase control flip-flops have the configuration $K4 \cdot \overline{K5} \cdot K6$ (FIGURE 5) for the $\phi2$ operational phase. Therefore, for the $\phi2$ operational phase, an integration of a selected function in the Yo register is effectuated each thirty-two word times. Also, and so that these integrations may proceed in accordance with real time, the system is permitted to execute a $\phi2$ phase integration only in the presence of a $\Delta t_{200}$ bit at the P0 bit position in the Xo register.

The $\phi3$ operational phase of FIGURE 4C, as mentioned above, is used when the integration of a function during the $\phi2$ operational phase requires a double length register to hold the information. In such a case, for instance, the integrand from the flip-flop Yo1 is of one word in length, and the integral from the flip-flop Yo2 is two words in length. The $\phi3$ operational phase follows directly after the $\phi2$ operational phase, under conditions when $\phi3$ operational phase is required.

For the $\phi3$ operational phase, the actual integrating process proceeds during the preceding $\phi2$ operation in the manner described above. Then, during the second word time, the phase control flip-flops are set to the K4.K5.K6 configuration (FIGURE 5). During the second word time, the continuation of the sign digit of the integrand must be obtained and added into the most significant half of the integral. To accomplish this, and as mentioned above, the flip-flop Yo1, which is fed with the sign digit of the integrand at P0 time at the end of the $\phi2$ operation phase, is held in that configuration during the entire word time of the $\phi3$ operational phase.

The above operations are carried out by the logic associated with the Yo1 flip-flop, which logic may be represented by the following equations:

$$y_01 = (\overline{K4} + \overline{K6} + K5 \cdot P0 + \overline{K5} \cdot \overline{P0} + \overline{K5} \cdot \overline{T3})$$
Output from read amp. 40
$$\overline{y_01} = (\overline{K4} + \overline{K6} + K5 \cdot P0 + \overline{K5} \cdot \overline{P0} + \overline{K5} \cdot \overline{T3})$$
$\overline{\text{Output from read amp. 40}}$ The logic represented by the above equations serves to disqualify the inputs to the flip-flop Yo1 during the $\phi3$ operational phase. This permits the sign digit of the integrand to be held in the Yo1 flip-flop during the entire $\phi3$ operation, so that the proper information may flow through the two input adder BB of FIGURE 4C during the $\phi3$ phase.

For the fourth operational phase $\phi4$, as shown in FIGURE 4D, a function is added to itself for shifting purposes. This operation is cyclically repeated to obtain successive shifts of the function to the left towards the most significant bit position. This left shift operation is particularly useful to data link operation, as mentioned above, in which the word to be processed must be shifted each word time so that a different bit is available for detection at a selected bit time of successive word times.

The $\phi4$ operational phase, therefore, causes the word read from the flip-flop Yo2 to be shifted one bit to the left each time it is sensed, that is, once for each half drum revolution of the memory drum of FIGURE 2. This is accomplished, as noted, by adding the contents of the Yo2 flip-flop to itself through the two input adder BB. The $\phi4$ operational phase repeats for twenty successive compute cycles, to permit each bit to be detected. For the $\phi4$ phase operation, the control flip-flops assume the configuration $\overline{K4} \cdot \overline{K5} \cdot K6$, as shown in FIGURE 5.

The fifth operational phase $\phi5$, as shown in FIGURE 4E, involves a +1 or +2 increment adder CC, a pair of emitter followers F1, $\overline{F1}$, a pair of emitter followers F2, $\overline{F2}$; the carry flip-flops C3, C4 and C5; and the time standard flip-flops TS.

The logic associated with the above elements can be expressed as follows:

$$f_1 = Yo2(K4 + K6) + Yo1 \cdot \overline{K4} \cdot \overline{K5} \cdot \overline{K6} + Mn \cdot \overline{K4} \cdot \overline{K5} \cdot \overline{K6}$$
$$\overline{f_1} = \overline{Yo2}(K4 = K6) + \overline{Yo1} \cdot \overline{K4} \cdot K5 \cdot \overline{K6} + \overline{Mn} \cdot \overline{K4} \cdot \overline{K5} \cdot \overline{K6}$$
$$f_2 = Yo2 \cdot \overline{K4} \cdot \overline{K5} \cdot K6 + Yo1 \cdot K4 \cdot K6 + Xo2 \cdot \overline{K4} \cdot K5 \cdot K6$$
$$\overline{f_2} = \overline{Yo2} \cdot \overline{K4} \cdot \overline{K5} + \overline{Yo1} \cdot K4 + \overline{Xo2} \cdot \overline{K4} \cdot K5$$
$$c_3 = F1 \cdot F2(\overline{P0} + T4 \cdot T5) + P24 \cdot \overline{K4} \cdot K5 \cdot \overline{K6}$$
$$+ P0 \cdot T5 \cdot \overline{Sot} \cdot T4 \cdot C4$$

$$\overline{c_3} = P0[\overline{T5} + \overline{T4}(Sot + \overline{C4})] + \overline{F1} \cdot \overline{F2}[\overline{P0} + T4 \cdot T5(Sot + \overline{K4} \cdot K5 \cdot K6)]$$

$$c_4 = \overline{C5} \cdot \overline{Fe} + T[V2 \cdot Fe + H(V1 \cdot P0 + V3 \cdot P19 + V5 \cdot P13 + P5 \cdot TS + P5 \cdot Xo1)]$$

$$\overline{c_4} = \overline{C5} \cdot \overline{Fe} + T[\overline{V1} \cdot P0 + \overline{V3} \cdot P19 + \overline{V5} \cdot P13 + \overline{Xo1} \cdot \overline{TS} + \overline{K4} \cdot K5 \cdot K6 \cdot \overline{C5} \cdot W1 \cdot W2 + Fe \cdot \overline{V2} + \overline{Xo1} \cdot \overline{C5} \cdot \overline{P0} \cdot \overline{P5}(\overline{T5} \cdot \overline{T4} + T4 \cdot T5 + T1 + T2 + T3)]$$

$$c_5 = \overline{Fe} \cdot \Delta t2 + T[Fe \cdot C4 + H(V2 \cdot P0 + V4 \cdot P19 + V6 \cdot P13 + Xo1 \cdot \overline{TS} \cdot P5)]$$

$$\overline{c_5} = \overline{Fe} \cdot \Delta t2 + T[Fe \cdot \overline{C4} + \overline{V2} \cdot P0 + \overline{V4} \cdot P19 + \overline{V16} \cdot P13 + P5(\overline{Xo} + TS) + Ff \cdot \overline{P5} \cdot \overline{P0} \cdot \overline{C4} \cdot Xo1(T1 + T2 + T3 + T4 \cdot T5 + \overline{T4} \cdot \overline{T5})]$$

$$ts = \sigma t_1 \cdot \overline{H} + Fe \cdot V6 \cdot T + \overline{Fe} \cdot V3$$

$$\overline{t_s} = \overline{V3} \cdot Fe + T(P4 \cdot C4 \cdot C5 + \overline{Fe} \cdot V6)$$

For the $\phi 5$ operational phase, and as shown in FIGURE 4E, information is circulated from the flip-flop Yo of FIGURE 2 to the write amplifier 38 in an eight-word recirculating loop. As explained above, the $\phi 5$ phase is used, for example, for counting some cut-off frequency to zero in accordance with real time. For this phase, the value of the function to be counted to zero may be placed, for example, as a negative number in the Yo register, and at the $\Delta t_{800}$ time increments from the P5 bit position in the Xo register (FIGURE 3) are added as +1 or +2 carries in the +1 or +2 increment adder CC to count the function up to zero so as to yield a sign change at the P0 bit time for cut-off.

The $\phi 5$ operational phase is made to occur for one word time during each eight word interval as the memory drum 10 of FIGURE 2 rotates. During each such eight-word interval, the drum rotation is at a predetermined speed such that not less than one nor more than two of the $\Delta t_{800}$ time increment pulses can occur in that interval. These time increment pulses are derived from the time standard flip-flop $T_s$. As described above, each $\Delta t_{800}$ pulse is recorded in the P5 bit position of the Xo register of FIGURE 3, to serve as a memory bit. The memory bit is then added to the number representing the T1 increment which is recorded in the P4–P1 bit positions of the Xo register of FIGURE 3.

The memory bit $\Delta t_{800}$ referred to in the preceding paragraph is used to control the flip-flop C4 for the $\phi 5$ operational phase. The flip-flop C4 is set if but one $\Delta t_{800}$ pulse occurred, and it is reset if two $\Delta t_{800}$ pulses, occurred, in the corresponding eight word intervals of successive $\phi 5$ operational phases. The flip-flop C4 is set or reset at the P0 bit time just before the corresponding $\phi 5$ phase.

The logic circuitry associated with the carry flip-flop C3 is such that if the flip-flop C4 is in its true state, "+1" is added to the number circulating in the eight-word loop formed during the $\phi 5$ phase. Conversely, if the flip-flop C4 is false, the carry flip-flop C3 is controlled so that "+2" is added to the number circulating in the eight-word circulating loop. In this manner, the negative number in the Yo register is counted up to zero in accordance with real time increments.

The $\phi 5$ phase is indicated by the configuration $\overline{K4} \cdot K5 \cdot \overline{K6}$ of the phase control flip-flops, as shown in FIGURE 5. This configuration of the control flip-flops causes the emitter followers F1 and $\overline{F1}$ to follow the output of the flip-flop Yo1. The term $\overline{K4}$ holds the emitter follower $\overline{F2}$ high during the $\phi 5$ phase; and the logic associated with the emitter follower $\overline{F2}$, and the mutually exclusive logic associated with the emitter follower F2 holds the latter emitter follower low during this phase. Therefore, there are no normal carries during the $\phi 5$ phase, and the number circulated through the emitter followers F1 and $\overline{F1}$ is in effect added to zero.

When the flip-flop C4 is in its reset state, the carry flip-flop C3 is reset at P0 bit time just preceding the $\phi 5$ phase by the term $\overline{C4}$. This causes the flip-flop C3 to remain reset during P24 bit time of the $\phi 5$ phase word time.

The flip-flop C3 is then set at P23 bit time, and it then responds to normal carry logic. Therefore, if the flip-flop C4 is reset, the carry flip-flop C3 serves to cause "+2" to be added to the number circulated through the eight-word Yo register loop, during the corresponding $\phi 5$ phase word time.

On the other hand, when the flip-flop C4 is set, the carry flip-flop C3 is set at P24 bit time, to be reset by normal carry logic curing the $\phi 5$ phase word time. Therefore, if the flip-flop C4 is set, the carry flip-flop C3 serves to cause "+1" to be added to the number circulated through the eight-word Yo register loop during the corresponding $\phi 5$ first word time.

It follows, therefore, that for the $\phi 5$ phase, the flip-flop C4 must be controlled to be set at P0 bit time preceding a $\phi 5$ word time, if one of the $\Delta t_{800}$ pulses was received during the preceding eight word interval; and the flip-flop C4 must be controlled to be reset at P0 bit time preceding the corresponding $\phi 5$ phase word time, if two of the $\Delta t_{800}$ pulses were received. This control of the C4 flip-flop will now be described.

In any eight-word interval preceding a $\phi 5$ phase, the first time that the time standard flip-flop $T_s$ is set, an input is introduced to the write amplifier 32 of the Xo register of FIGURE 1 at P5 bit time, so as to be recorded at the P5 bit position as a $\Delta t_{800}$ pulse in the Xo register. At that time, the term $\overline{Xo1}$ is true because a zero appears at the P5 bit position in the Xo register prior to the initial setting of the time standard flip-flop $T_s$. A "1" is now recorded in the P5 bit position representative of a $\Delta t_{800}$ time pulse.

In addition to the operations described above, the first time that the time standard flip-flop $T_s$ is set during a seven-word interval preceding a $\phi 5$ phase causes the flip-flop C4 to be set at P5 bit time. Moreover, this initial setting of the flip-flop $T_s$ serves to reset the flip-flop C5 at P5 bit time.

The effect on the carry flip-flop C3 of these settings of the flip-flops C4 and C5 is immaterial because the first $T_s$ term always is more than one word time before the following $\phi 5$ phase word time. Therefore, even though the flip-flops C4 and C5 may contain +1 information, the logic associated with the flip-flop C3 will not be qualified to produce a +1 carry for the $\phi 5$ phase operation. The flip-flop C4 causes a "1" to be added into the P4 least significant bit position in the Xo register, thus serving to increase the $\Delta T_1$ increment of FIGURE 3 by one bit. The flip-flop C4 is subsequently reset by the normal logic circuitry.

During the succeeding word times until the next $\sigma t$ again sets the time standard flip-flop $T_s$, no additional increments should be added to the $\Delta T_1$ number in the Xo register. However, the flip-flop C4 must be set at each P0 bit time to indicate to a possible succeeding $\phi 5$ word time that a $\Delta t_{800}$ time standard pulse has been received. Therefore, if the term Xo1 is high at P5 bit time in the succeeding word times, indicating that a $\Delta t_{800}$ time standard pulse has been received, the flip-flop C4 is set at P4 bit time and it remains set so as to set the flip-flop C3 at the following bit time.

The above operations place the flip-flop C3 in a condition to add "+1" to the $\phi 5$ phase circulated number, should a $\phi 5$ phase occur during the succeeding word time. However, to nullify the "+1" effect of the flip-flop C4, when set, on the $\Delta T_1$ in the Xo register, the flip-flop C5 is also set when the term Xo1 is true at P5 bit time. When both the flip-flops C4 and C5 are set, a zero is added to the number $\Delta T_1$ in the Xo register. The fact that the flip-flop C5 is set permits the flip-flop C4 to remain set until P0 bit time, as is desired.

To carry out the operations described in the preceding paragraph, the term $\Delta t_{800} \cdot \overline{Xo1} \cdot P5$ sets the flip-flop C4, the term C4·P0 sets the flip-flop C3, and the term $\Delta t_{800} \cdot Xo1 \cdot P5$ sets the flip-flop C5, when the time standard flip-flop $T_s$ is reset.

Should a second $\Delta t_{800}$ pulse be received to set the flip-flop $T_s$ before the occurrence of a $\phi 5$ phase word time, the flip-flop C4 is set and the flip-flop C5 is reset at P5 bit time because another increment is to be added to the $\Delta T_1$ number in the $Xo$ register. The flip-flop C4, however, is permitted to be reset before the following P0 bit time to reset the flip-flop C3. The flip-flop C3 is, therefore, in the proper state, to cause "+1" to be added to the circulated word in the $Yo$ register, should a $\phi 5$ phase occur at the next word time.

To carry out the above operations, the term $Xo1 \cdot P5$ sets the flip-flop C4, and the term $P5 \cdot T_s$ resets the flip-flop C5. The flip-flop C4 is permitted to reset before P0 bit time, because the term $\overline{C5}$ is true. The flip-flop C3 is, therefore, reset by the $\overline{C4}$ term.

Should a $\phi 5$ operational phase word time fail to occur at the end of the word time before the receipt of the second $\Delta t_{800}$ pulse, the condition $\overline{Xo1}.T_s$ will occur at P5 bit time of the following word time. The flip-flop C4 is now reset and the flip-flop C5 is also reset at P5 bit time. This allows the flip-flop C4 to remain reset at the following P0 bit time, so as to add "+1" to the circulated $Yo$ word, in the event that the following word time is a $\phi 5$ phase word time.

The conditions described in the preceding paragraph are carried out by the term $\overline{Xo1}.T_s \cdot P5$ resetting the flip-flop C4, and the term $\overline{Xo1}.P5$ resetting the flip-flop C4. The control flip-flop C3 is controlled in the manner described above, to cause "+1" to be added to the circulated contents of the $Yo$ register during the $\phi 5$ phase word time.

In the described manner, therefore, the one-increment add and subtract flip-flops C4 and C5 are controlled in response to the time standard flip-flop $T_s$ to cause "+1" or "+0" to be added to the $\Delta T_1$ content of the $Xo$ register. The flip-flop C4 is also controlled, in the described manner, to assume the proper state at the proper time to cause the carry flip-flop C3 to add "+1" or "+2" to the $\phi 5$ phase circulating contents of the $Yo$ register. In this manner, the number in the $Yo$ register may be counted up to zero (if it is negative) in accordance with real time increments. Conversely, the number in the $Yo$ register may be counted up to a spill-over condition (if it is positive).

For the sixth operational phase $\phi 6$ of FIGURE 4F, the information introduced into the $Yo$ register by the computer 12 of FIGURE 1 is recirculated unchanged. This is a 32-word recirculation, and for this phase, the contents of the flip-flop; $Yo2$ of FIGURE 2 are read into the write amplifier 38, as shown in FIGURE 4F. The control flip-flops take the configuration $K4 \cdot \overline{K5} \cdot \overline{K6}$, as shown in FIGURE 6, for the $\phi 6$ operational phase.

The contents of the flip-flop $Yo2$ are introduced, therefore, to the write amplifier 38, as shown in FIGURE 4F, and the contents are added to zero during such introduction for normal circulation. The result, therefore, is the establishment of a 32-word recirculating loop for the $\phi 6$ phase.

The seventh phase $\phi 7$ causes the analog-digital converter scanning flip-flop $Mn$ to read its contents into the $Yo$ register, as shown in FIGURE 4G. The $\phi 7$ phase is represented by the configuration $\overline{K4} \cdot \overline{K5} \cdot \overline{K6}$ of the phase control flip-flops, as shown in FIGURE 5. This configuration causes the contents of the flip-flop $Mn$ to be read into the write amplifier 38 for introduction to the circulating register $Yo$.

The eighth phase $\phi 8$ appears immediately after the $\phi 1$ phase word time during which the time increment $\Delta T_1$ from the $Xo$ register is transferred to the $Yo$ register. The control flip-flops assume the configuration $K4 \cdot K5 \cdot \overline{K6}$, as shown in FIGURE 5, for the $\phi 8$ phase. In order that provisions may be made to accumulate ample time in the $Yo$ register, the time function $T_1$ is stored in that register as a two word function. The successive time increments $\Delta T_1$ are transferred from the $Xo$ register to the $Yo$ register at the selected time during the $\phi 1$ phase transfer. Immediately after that time, the $\phi 8$ phase word occurs to enable carries to be inserted into the second word position of the time function $T_1$ in the $Yo$ register.

The carry flip-flop C3 is normally disabled at P0 bit time. However, just preceding the $\phi 3$ phase or $\phi 8$ phase, the carry flip-flop C3 continues to respond to outputs from the F1 and F2 followers to form carries into the second word position of the time function $T_1$ in the $Yo$ register.

The $\phi 6$ phase is also used for recirculating the integral during the $\phi 2$ phase time integration operation, when the absence of a $\Delta t_{200}$ dictates that no integration is to be made for that particular circulation. As explained above, the absence of a $\Delta t_{200}$ bit forces the control flip-flops to the $K4 \cdot \overline{K5} \cdot \overline{K6}$ configuration of phase $\phi 6$. During this latter configuration, the term K4 causes the emitter follower F2 to be low and the emitter follower $\overline{F2}$ to be high throughout the entire operation.

However, the emitter followers F1 and $\overline{F1}$ follow the $Yo2$, $\overline{Yo2}$ outputs. The latter outputs represent the integral formed as a result of successive $\phi 2$ phase operations, and that integral is added to zero in the adder BB of FIGURE 4C. This is because the emitter follower F2 is held low during the entire circulation, as explained above. Therefore, the absence of the $\Delta t_{200}$ bit during the phase integration causes the control flip-flops to be forced to the $\phi 6$ phase configuration $K4 \cdot \overline{K5} \cdot \overline{K6}$, as explained, and the integral is circulated unchanged.

As described above, the time standard pulses $\sigma t_1$ are derived from the precision frequency source 41 (FIGURE 6), and each time one of these pulses occurs, the time standard flip-flop $T_s$ is set. Then, the one increment flip-flop C4 is set, so that the time increment can be added to the increments of time $\Delta T_1$ already accumulated in the P4–P1 bit positions of the $Xo$ register.

As described, the phase $\phi 2$ integrations proceed on the basis of real time under the control of the $\Delta t_{200}$ bits stored at the P0 bit position in the $Xo$ register of FIGURE 3. An integration is made for each $\phi 2$ phase circulation at which a $\Delta t_{200}$ pulse appears, and the integral is circulated unchanged in a $\phi 6$ phase configuration in the absence of a $\Delta t_{200}$ bit.

Also, the $\phi 5$ phase velocity cut-off operation proceeds on the basis of real time, and under the control of the $\Delta t_{800}$ bits stored in the P5 bit position in FIGURE 3.

The phase $\phi 2$ operation is carried out by the 32-word recirculating loop, as shown in FIGURE 4C, and the $\phi 5$ phase operation is carried out on the basis of the 8-word recirculating loop as shown in FIGURE 5E. For that reason, extraneous count-down circuitry would normally be required when a single precision frequency source is used to control both operations.

In the system of the embodiment of the present invention described herein, however, the single precision frequency source 41 is used to control both the $\phi 2$ phase and the $\phi 5$ phase operations, and this is achieved without the need for extraneous count-down circuitry. The precision frequency source 41 (FIGURE 6) for the $\Delta t_{200}$ and the $\Delta t_{800}$ bits may, as described above, be a one megacycle crystal oscillator. Appropriate frequency dividing circuitry 39 (FIGURE 6) is coupled to the oscillator, as explained, to reduce its frequency to one megacycle. The oscillator divider system produces the time standard pulses $\sigma t_1$, which control the same standard flip-flop $T_s$.

Now, during the $\phi 5$ phase operation, and as described above, the $\Delta t_{800}$ bits at the P5 bit position in the $Xo$ register are used to control the velocity cut-off integrations. The $\phi 5$ phases occur, as explained above, once during each 8-word interval as the memory drum 10 of FIGURE 2 rotates.

When during any of the 8-word intervals, the flip-flop $T_s$ is first set, a $\Delta t_{800}$ bit is recorded at the P5 bit position in the $Xo$ register. This is because either the term $T_s \cdot \overline{Xo1}$ is true or $T_s.(\phi5)$ is true. The flip-flop $T_s$ is reset before the next word time, and if it remains reset at the next word time, indicating that a second $\sigma t_1$ pulse has not been received, the $\Delta t_{800}$ bits continue to be recorded at the successive P5 bit positions. This condition obtains for the reasons described in the description of the $\phi5$ phase operation.

The $\Delta t_{800}$ bits continue to be recorded at the successive P5 bit positions in the $Xo$ register under the above conditions because the term $Xo1.\overline{T_s}(\phi5)$ is now true. Now, should the flip-flop $T_s$ be set, the term $T_s.Xo1.(\overline{\phi5})$ becomes true. When that occurs, a zero is written at the P5 bit position in the $Xo$ register. These zeros continue to be written at the successive P5 ($\Delta t_{800}$) bit positions of the $Xo$ register until a $\phi5$ phase occurs. In the manner described, therefore, the $\Delta t_{800}$ bits are recorded, or deleted from, the P5 bit position of the $Xo$ register to provide the desired control during the $\phi5$ phase.

The $\Delta t_{200}$ bits are recorded at the P0 bit position in the $Xo$ register for controlling the integrations during the $\phi2$ phase of FIGURE 4C. It will be remembered that the presence of a $\Delta t_{200}$ bit permits the system to execute a $\phi2$ phase integration, in the absence of a $\Delta t_{200}$ at the time such an integration would normally occur forces the system to recirculate in a $\phi6$ phase operation. It will also be remembered that the $\phi1$ operation occurs once for every 32 word times, and that the different increments accumulated in the $Xo$ register are transferred to the $Yo$ register during that phase. The time increment $\Delta T_1$ is so transferred from the $Xo$ register to the $Yo$ register during the $\phi1$ phase, and at a time established by the flip-flops W1 and W2, when these flip-flops are both set.

Therefore, a $\Delta t_{200}$ is entered into the P0 bit position in the $Xo$ register when the term W5 is true, and this insertion takes place at the time of the transfer of the time word $\Delta T_1$ during the $\phi1$ phase transfer. If the term W5 is false, the $\Delta t_{200}$ bit is deleted, and a zero is entered into the P0 bit position of the $Xo$ register at that time. As described above, each time the $\Delta t_{200}$ is so deleted, the system is forced into the $\phi6$ phase recirculate mode, instead of the $\phi2$ phase integrate mode. This control enables the $\phi2$ integration to proceed on the basis of real time under the control of the $\Delta t_{200}$ bits.

The case can arise in which the term W5 remains false after a first deletion has occurred. However, under no circumstances are two successive deletions of the $\Delta t_{200}$ bits required. Therefore, the logic provides the term $\overline{Xo1}$ which occurs following the first deletion of the $\Delta t_{200}$ bit causes a "1" to be inserted at the P0 bit time, even though the term W5 is still false.

In the system described above, and as mentioned previously, the $\phi2$ phase integration is carried out by a 32-word recirculating loop, and the $\phi5$ phase integration is carried out by an 8-word recirculating loop. The deletions of the time increments $\Delta t_{200}$ must proceed, therefore, on a scale which produces one deletion for the $\Delta t_{200}$ bits for every four deletions of the $\Delta t_{800}$ bits.

As noted, an external count-down circuit is not required for the above control in the system of the invention. Instead, the revolutions of the memory drum 10 are compared with the accumulations of real time $T_1$ in the $Yo$ register. Whenever there is a difference of four, or multiples thereof, between the accumulated real time $T_1$ and the drum revolutions, the corresponding $\Delta t_{200}$ bit should be, and is, deleted.

In the system of the invention, the $\phi1.W1.W2$ time word transfer time is made to occur when the P22 and P23 bits of the drum word time are zero. Therefore, the drum word time can be neglected for the above comparison, when the sampling of the P22 and P23 bits of the real time word T1 is made at the time word transfer time $(\phi1).W1.W2$. The P22 and P23 bits of the accumulated real word time $T_1$ in the $Yo$ register count down to zero at the $(\phi1).W1.W2$ word time transfer time when four deletions have occurred in the real time increments $\Delta t_{800}$. Therefore, the term Fo is low at P22 and P23 bit times during the word time transfer time $(\phi1).W1.W2$ only when the accumulated real time $T_1$ in the register $Yo$ has slipped four bits with respect to the drum word time. That is the time that a $\Delta t_{200}$ bit must be deleted.

The invention provides, therefore, an improved auxiliary computer system to be used in conjunction with a general purpose computer. The improved auxiliary computer system of the invention serves to adapt the general purpose computer to a range of applications in which it normally is incapable of being used.

In the particular embodiment described herein, the auxiliary computer of the invention enables a general purpose computer to be used for the accumulation and integration of velocity and time terms, on a real time basis, and renders the resulting invention ideal for missile guidance, and for other guidance systems.

While a particular embodiment of the invention has been shown and described, modifications may be made, and it is intended to cover all modifications which fall within the scope of the invention.

What is claimed is:
1. In combination, a general purpose computer including a memory storage system, and an auxiliary computer coupled to said general purpose computer, said auxiliary computer including: a first accumulator circulating register including a portion of said memory storage system and including a one-increment adder-subtractor network connected thereto, through which the contents of said first accumulator circulating register are circulated; input circuit means coupled to said first accumulator circulating register for feeding input pulses thereto representing increments of a plurality of functions, said increments being accumulated in said first accumulator circulating register as multi-bit binary numbers and stored at segregated locations therein; a second circulating register including a further portion of said memory system and in which said increments are further accumulated and stored as multi-bit binary numbers at segregated locations therein; and including a further two-input adder network connected thereto; further circuit means coupling said first accumulator circulating register to said second circulating register and settable to a first operational phase to cause the multi-bit binary numbers at the segregated locations in said first accumulator circulating register to be added in said further two-input adder network to corresponding ones of the multi-bit binary numbers at the segregated locations in said second circulating register and to cause the resulting multi-bit binary numbers to be respectively stored at said segregated locations in said second circulating register; an order register coupled to said memory storage system for holding different order codes in response to a pre-established program in said memory storage system; and logic control circuitry coupled to said further circuit means to render said further circuit means operative in response to a predetermined order code in said order register, said logic control circuitry responding to the different order codes held in said order register and introduced therein by said memory storage system so as to set said further circuit means to said first operational phase and to further operational phases to cause said further circuit means to perform different logic operations on the contents of said second circulating register.

2. The system defined in claim 1 in which said further circuit means is settable to a further operational phase by said logic circuitry in response to a predetermined order code in said order register to cause said multi-bit binary number in said secondary circulating register to be shifted from one bit position to the next for each successive circulation of the contents of said second circulating register.

3. The system defined in claim 1 in which said further circuit means is settable to a further operational phase by said logic control circuitry in response to a predetermined order code in said order register to cause the contents of said second circulating register to circulate through said second two-input adder network in unchanged form in successive re-circulating cycles thereof.

4. The system defined in claim 1 in which said logic control circuitry cyclically sets said further circuit means to said first and further operational phases thereof, and which includes further circuitry coupled to said first accumulator circulating register for clearing said first accumulator circulating register at the termination of each cycle after which said further circuit means is set to said first operational phase by said logic control circuitry.

5. The system defined in claim 1 in which said further circuit means is settable to a further operational phase under the control of said logic control circuitry in response to a predetermined order code in said order register to cause the contents of said second circulating register at at least one of said segregated locations therein to be integrated in a plurality of successive cycles and to cause the resulting binary number to be stored in said second circulating register.

6. The system defined in claim 5 and which includes a source of time indicating signals coupled to said input circuit means to introduce time indicating signals to said first accumulator circulating register, and which includes time standard control circuit coupled to said further circuit means to control the introduction of said time indicating signals to said second circulating register during said last named further operational phase.

7. The system defined in claim 1 in which said memory storage system includes a movable magnetic memory member.

References Cited

UNITED STATES PATENTS 3,274,376   9/1966   Evans et al. _____ 235—150.31

MALCOLM A. MORRISON, *Primary Examiner.*

DAVID H. MAZAHN, *Assistant Examiner.*

U.S. Cl. X.R.

235—150.31